Sept. 19, 1944.  H. CAVE ET AL  2,358,443
BRUSH MAKING MACHINE
Filed Feb. 16, 1942  14 Sheets-Sheet 1

Sept. 19, 1944.  H. CAVE ET AL  2,358,443
BRUSH MAKING MACHINE
Filed Feb. 16, 1942  14 Sheets-Sheet 2

INVENTORS.
Henry Cave
Alfred H. Fuller
by Alfred LeFebvre
Arthur B. Jenkins
ATTORNEY

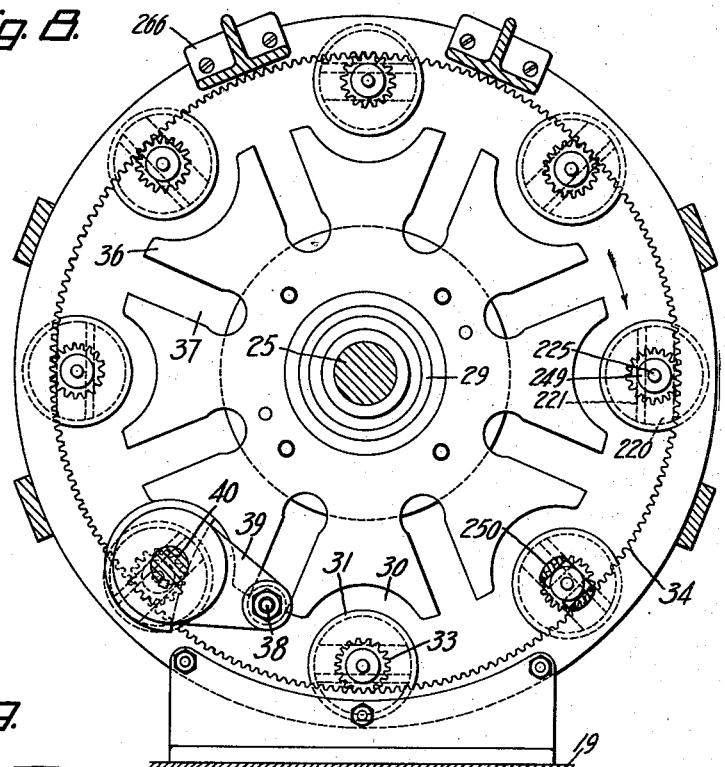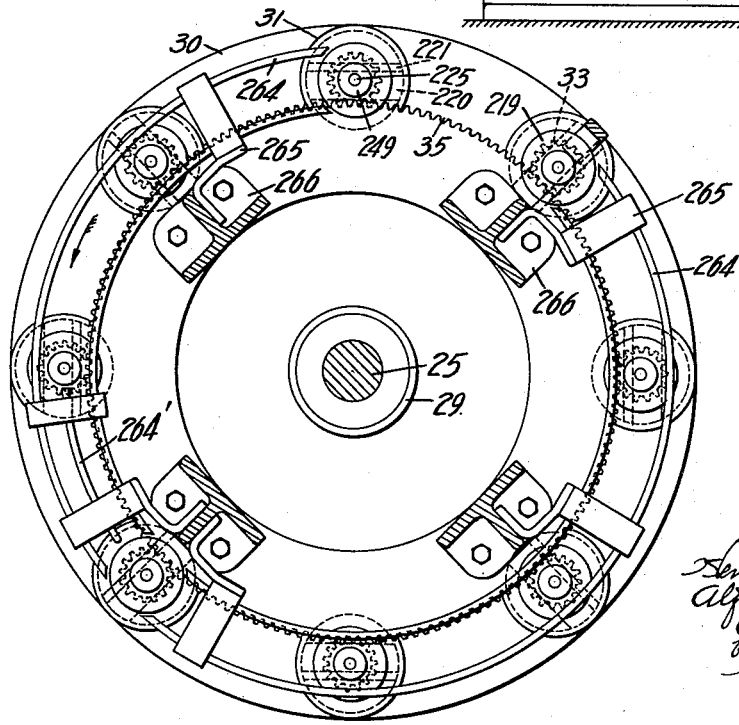

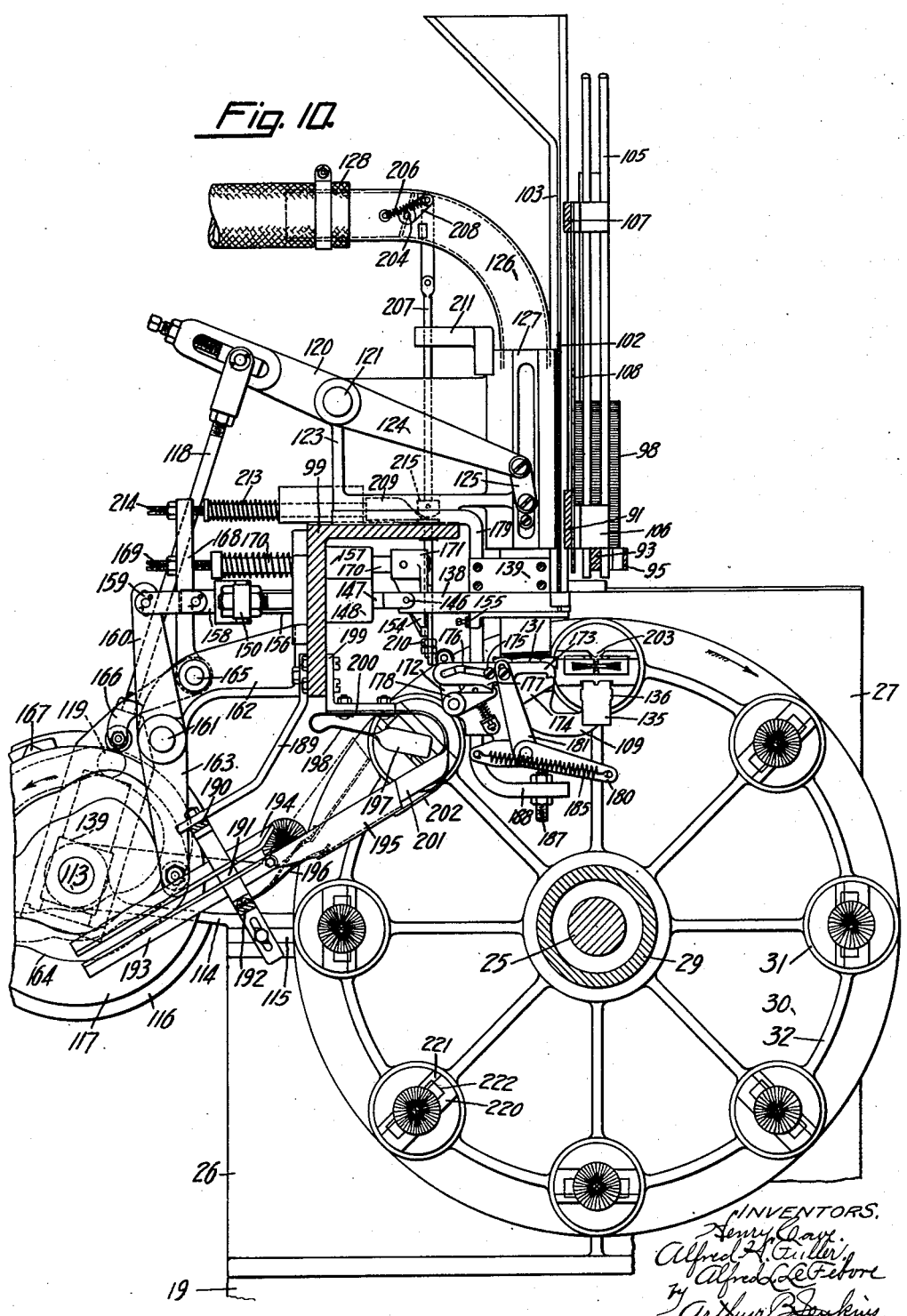

Sept. 19, 1944. H. CAVE ET AL 2,358,443

BRUSH MAKING MACHINE

Filed Feb. 16, 1942 14 Sheets-Sheet 11

INVENTORS.
Henry Cave
Alfred H. Fuller
Alfred LeFebvre
by Arthur B. Jenkins
ATTORNEY

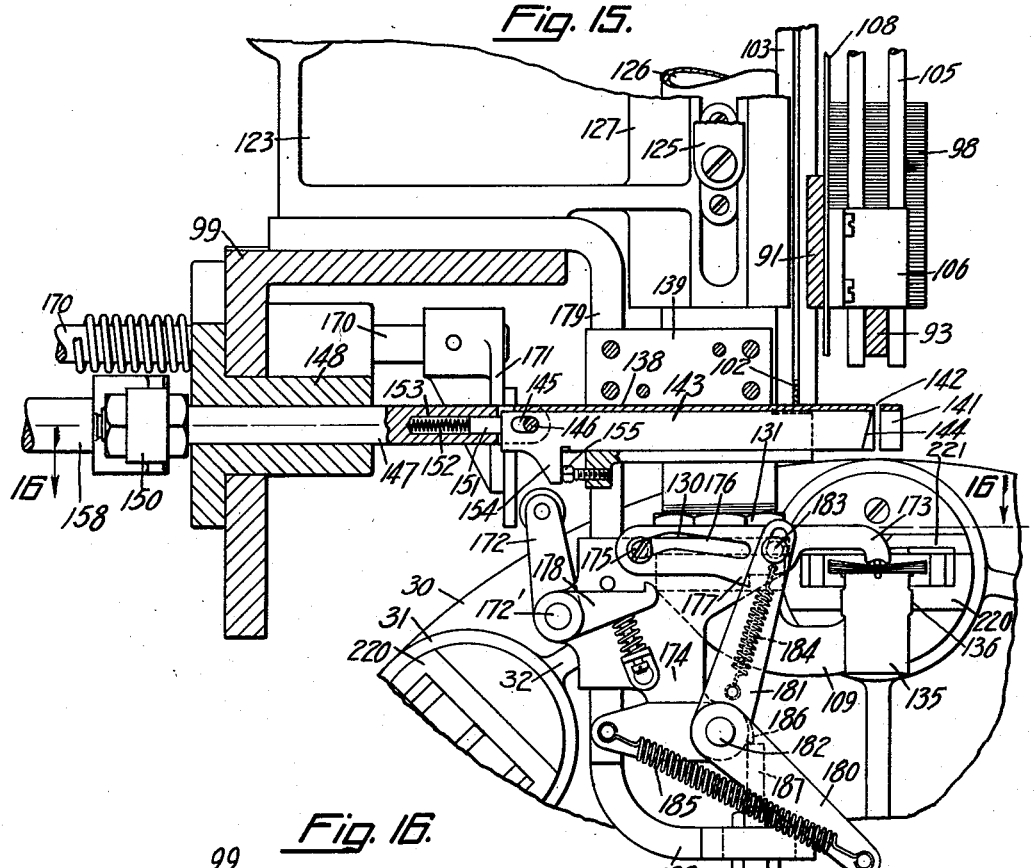
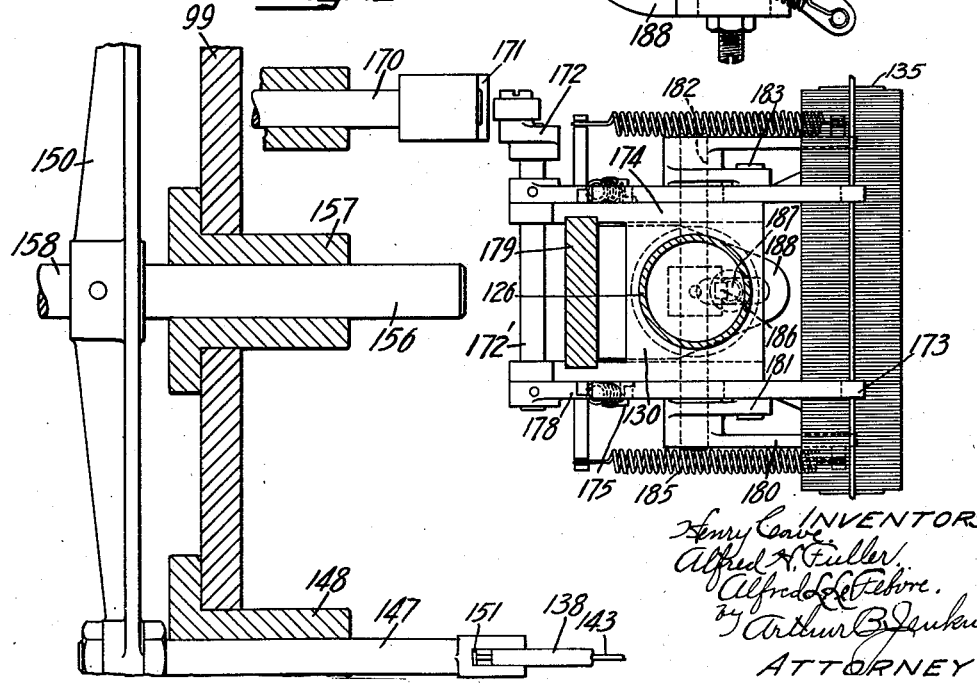

Sept. 19, 1944.　　　H. CAVE ET AL　　　2,358,443
BRUSH MAKING MACHINE
Filed Feb. 16, 1942　　　14 Sheets-Sheet 13
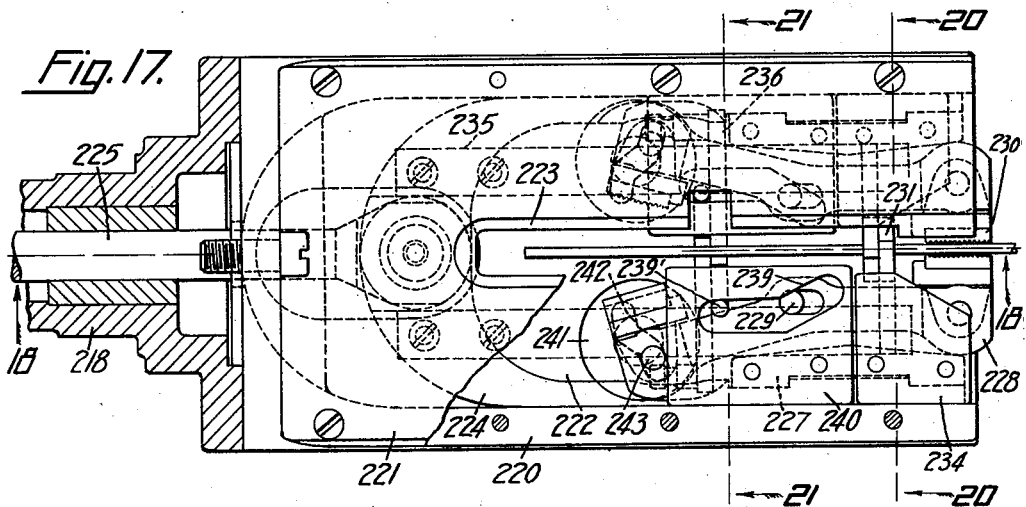
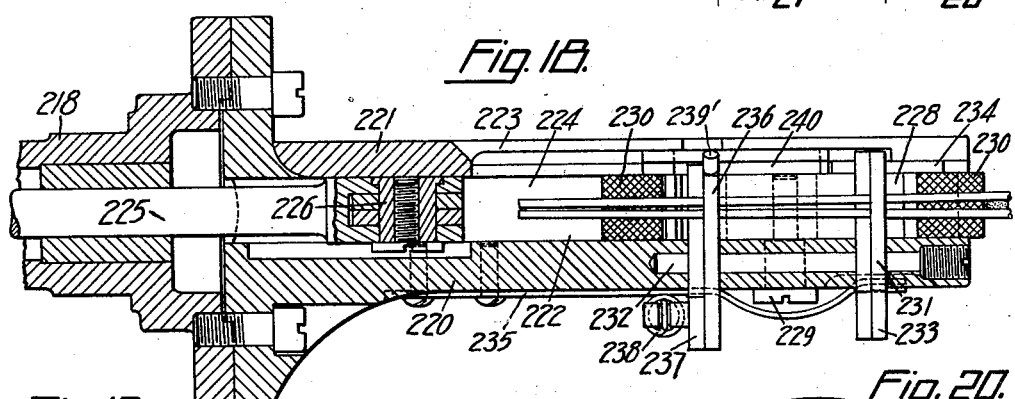
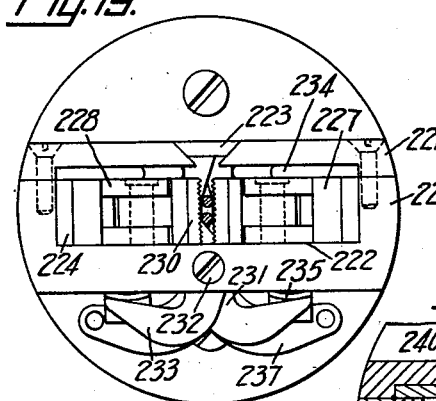
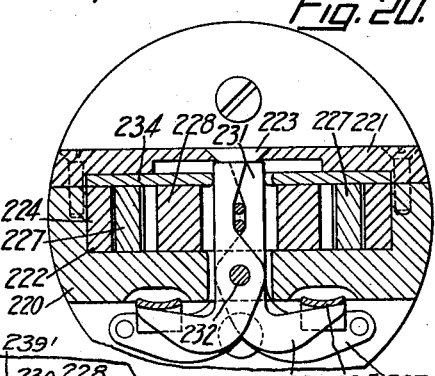
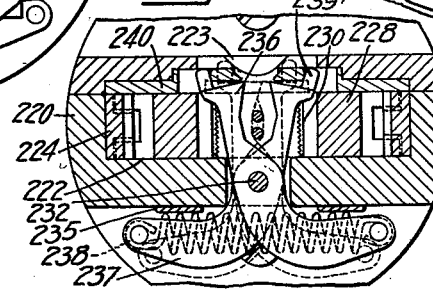

Sept. 19, 1944. H. CAVE ET AL 2,358,443
BRUSH MAKING MACHINE
Filed Feb. 16, 1942 14 Sheets-Sheet 14
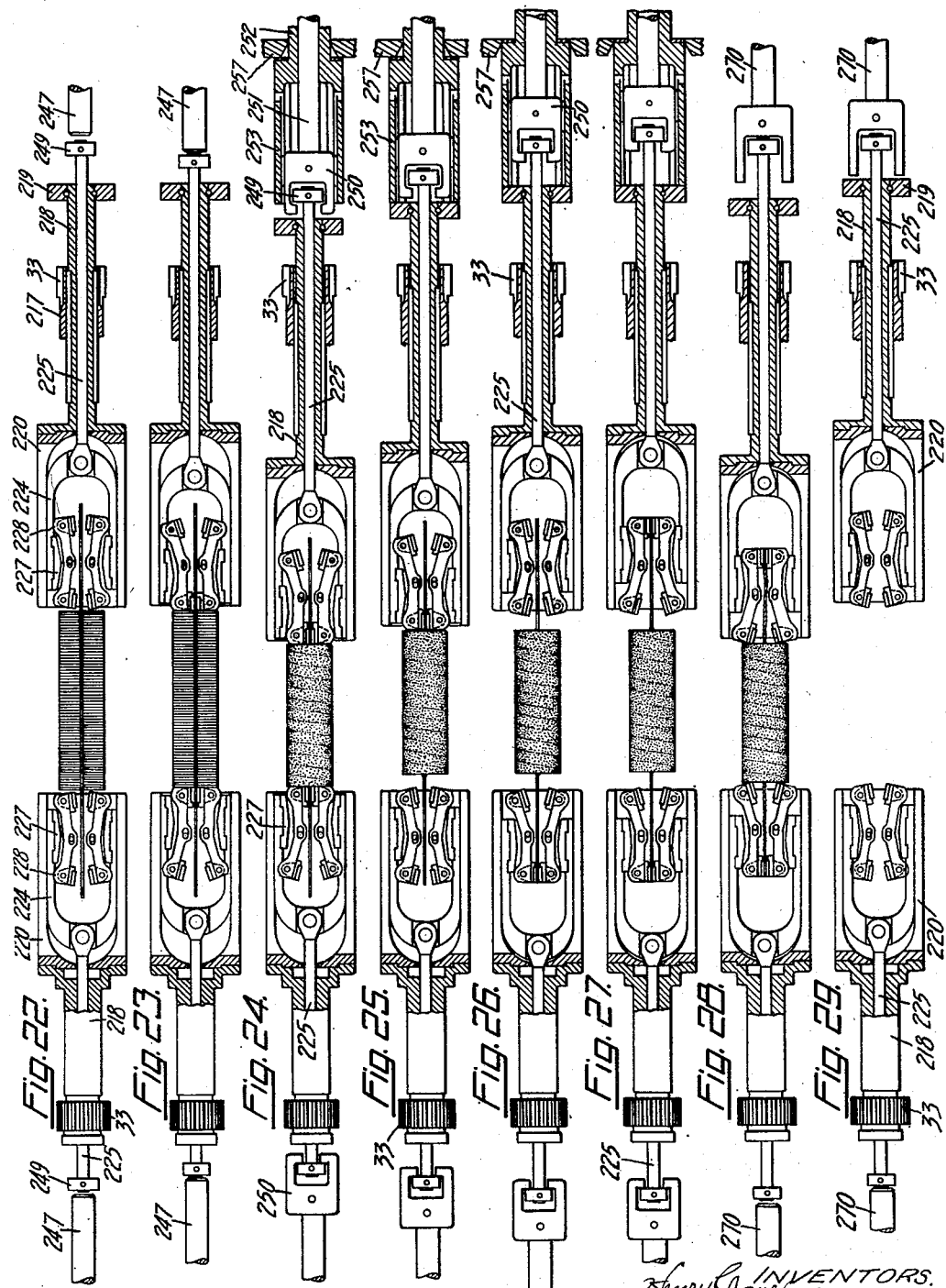

Patented Sept. 19, 1944

2,358,443

UNITED STATES PATENT OFFICE 2,358,443

BRUSHMAKING MACHINE

Henry Cave, Hartford, Alfred H. Fuller, West Hartford, and Alfred L. Le Febvre, Windsor, Conn., assignors to The Fuller Brush Company, Hartford, Conn., a corporation of Connecticut Application February 16, 1942, Serial No. 431,026

44 Claims. (Cl. 300—2)

This invention relates to the class of machines which are employed for twisting wires to secure brush material within the twisted portion thereof, and an object of the invention, among others, is to provide a machine for automatically twisting the wires in a rapid and satisfactory manner to secure the brush material within the twists.

One form of a brush wire twisting machine embodying the invention, and in the construction and use of which the objects herein set out, as well as others, may be attained is illustrated in the accompanying drawings, in which—

Figure 8 is a view in section on a plane denoted by the broken line 8—8 of Fig. 5.

Figure 9 is a view in section on a plane denoted by the broken line 9—9 of Fig. 4.

Figure 10 is a view on enlarged scale in cross section on a plane denoted by the broken line 10—10 of Fig. 1.

Figure 15 is a view in section on a plane denoted by the broken line 14—14 of Fig. 12, but showing the bristle carrier in a lower position with means for holding the bristles thereon.

Figure 16 is a view in section on a plane denoted by the dotted line 16—16 of Fig. 15.

Figure 17 is a side view on enlarged scale of the chuck with parts broken away to show construction.

Figure 18 is a view in section on a plane denoted by the broken line 18—18 of Fig. 17.

Figure 19 is an end view of the chuck.

Figure 20 is a view in section on a plane denoted by the broken line 20—20 of Fig. 17.

Figure 21 is a view in section on a plane denoted by the broken line 21—21 of Fig. 17.

Figures 22 to 29 inclusive are explanatory views illustrating the different positions of the chuck members in the operations of securing and releasing the wires.

Figure 1:
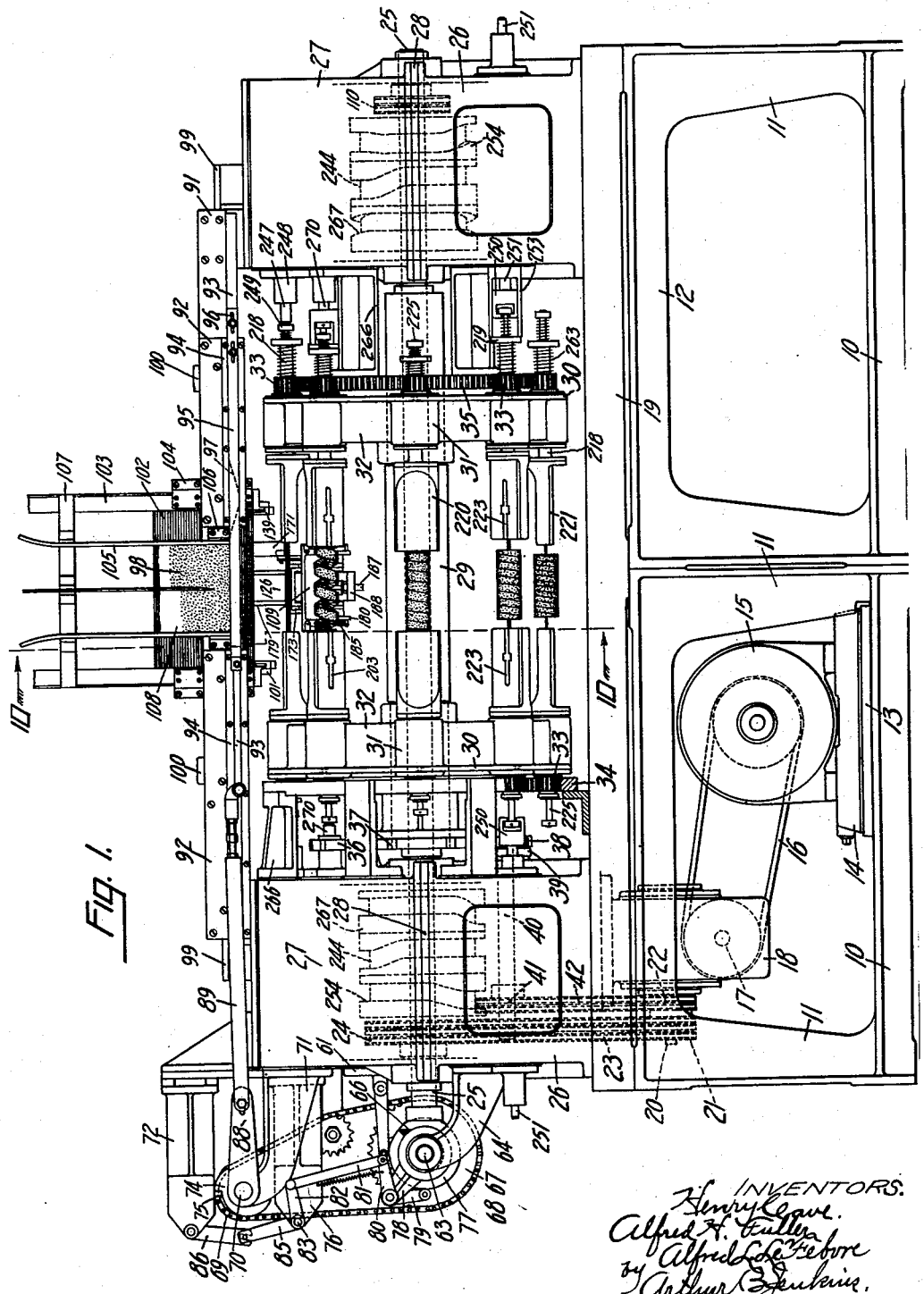
Figure 1 is a view in front elevation of a machine embodying the invention, partially broken away to show construction.

The machine embodying this invention comprises a base frame in which the main driving mechanism is located and a brush making frame mounted on the base frame and supporting the brush making mechanism, the base frame preferably including two sections comprising opposite ends of said base frame and of substantially the same size and form. Each of these sections comprises side frames at opposite sides of each section and each side frame includes side bars 10 extending lengthwise of the section at the bottom thereof, supporting posts 11 at each end of each section and top bars 12 connecting the posts at the top on each side of each frame, as shown in Fig. 1 of the drawings. A motor supporting base 13 is secured to the bottom side bars, extending across the frame on one of the sections and a motor base 14 is mounted on said supporting base with a motor generally indicated by the numeral 15 mounted on the motor base and connected as by a belt 16 with a main driving shaft 17 supported in bearings in a reduction gearing case 18 secured to and depending from the under side of a table 19 comprising the bottom or base for the support of the brush making mechanism. The reduction gearing within the case 18 may be of any well known form and further description is therefore omitted herein, suffice to say that it includes a shaft 20 extending out at one side of the case and having sprocket wheels 21 and 22 secured thereto. The sprocket wheel 21 is connected by a chain 23 with a sprocket wheel 24 secured to a cam shaft 25 extending from end to end of the main frame and supported in a manner presently to be described.

The brush making mechanism comprises a housing at each end of the main frame with turret supported chucks for holding and twisting wires supported between said housings. Each of these housings consists of a bottom and a top section, the bottom section 26 at each end of the main frame being recessed at its top edge on opposite sides to receive plates 28 spaced apart at their crosswise centers to create openings for operating mechanism to be hereinafter described. The top section 27 of each housing rests upon and is secured to the bottom section 26 in any suitable manner, as by means of screw bolts, a specific showing of which is omitted herein. The turret just mentioned is supported in spaced relation with respect to said housings upon a turret supporting shaft 29 which is hollow to receive the cam shaft 25 that extends through the turret supporting shaft and is mounted in suitable bearings in the housings at each end of the main frame as hereinbefore mentioned. The shaft 29 is supported by the cam shaft 25 in any suitable manner, as by means of ball bearings (not herein shown) which permit rotation of the turret independently of the cam shaft.

Figure 4:
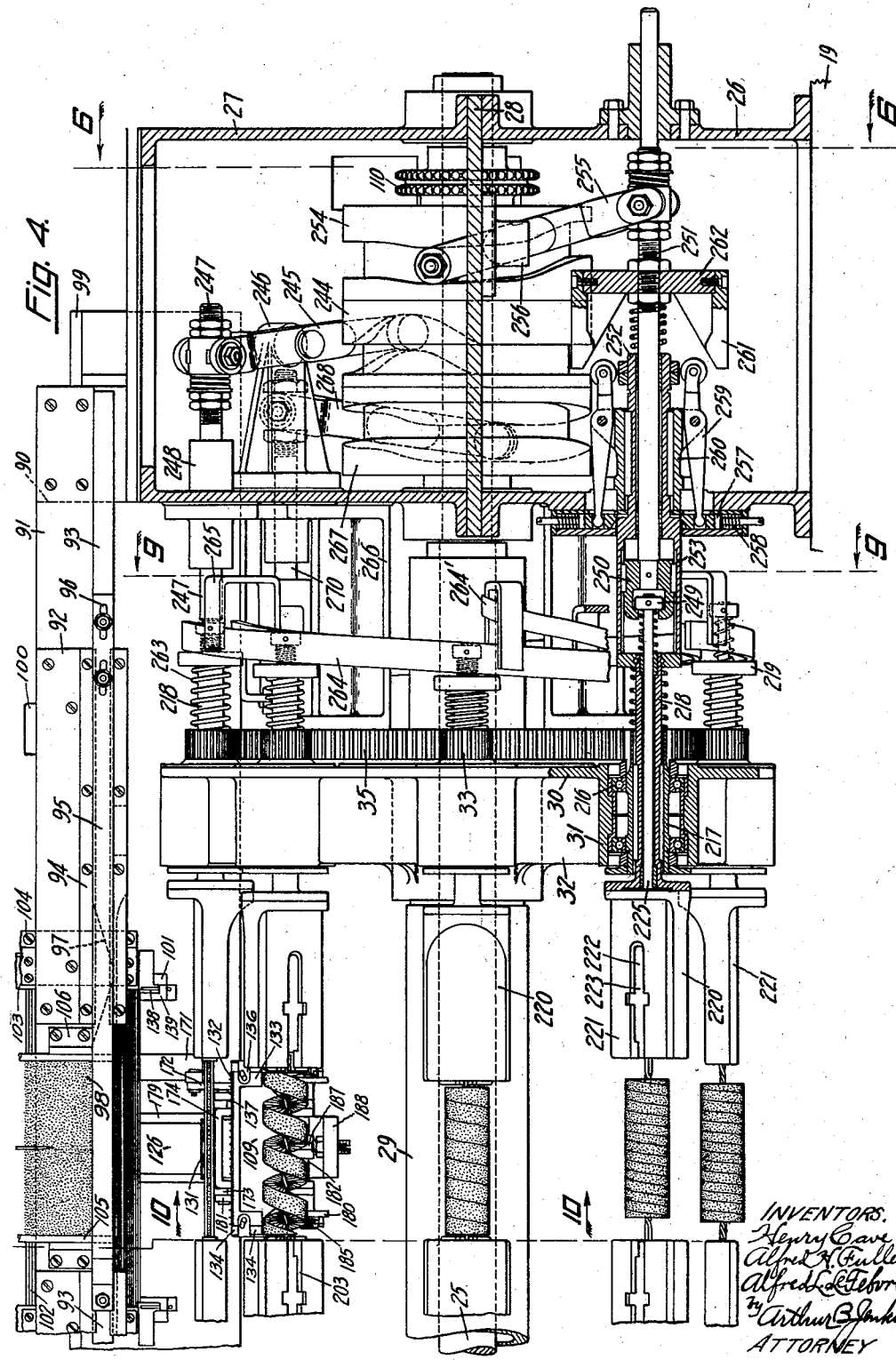
Figure 4 is a view in front elevation on enlarged scale of the righthand end of the machine shown in Fig. 1 and in section approximately on the broken line 4—4 of Fig. 6.

The turret is composed of two spiders spaced apart and secured to the shaft 29. These spiders each includes a disk 30 having chuck supporting bosses 31 projecting therefrom in pairs, said bosses being united by webs 32. The members of each pair are located directly opposite each other and cooperate in the twisting action in a manner to be hereinafter described, with the brief explanation that each chuck comprises a pinion 33 secured to the chuck and meshing with the teeth of a stationary ring gear 34 at one end and a common gear 35 at the opposite end. The pinions 33 at the righthand end of the machine, as shown in Fig. 4, mesh with the teeth of the gear 35 which is stationary so that as the chucks with the pinions 33 are revolved by the rotation of the turret the chucks will be rotated in one direction while the pinions 33 for driving the chucks in the opposite end of the turret meshing inside of the ring gear 34 are rotated in an opposite direction, the chucks at opposite ends of the turret, being thus driven in opposite directions, effect quick twisting action of the wires held by the chucks. The chucks are arranged to grip the wires at different points lengthwise thereof during each twisting operation in a manner to be hereinafter described.

Figure 5:
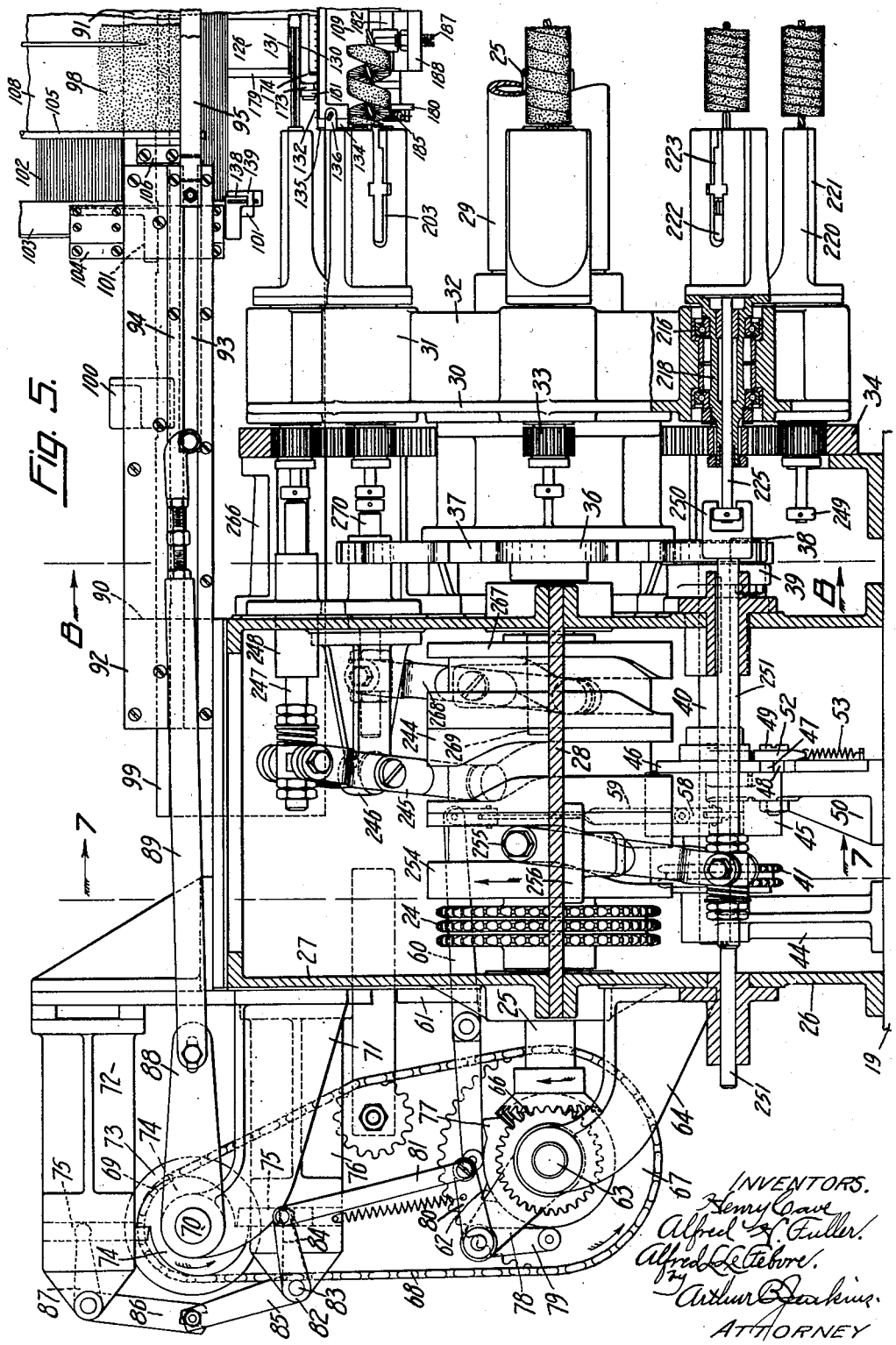
Figure 5 is a view similar to Fig. 4 but showing the opposite end of the machine from that shown in Fig. 4 and approximately on the dotted line 5—5 of Fig. 7.
Figure 7:
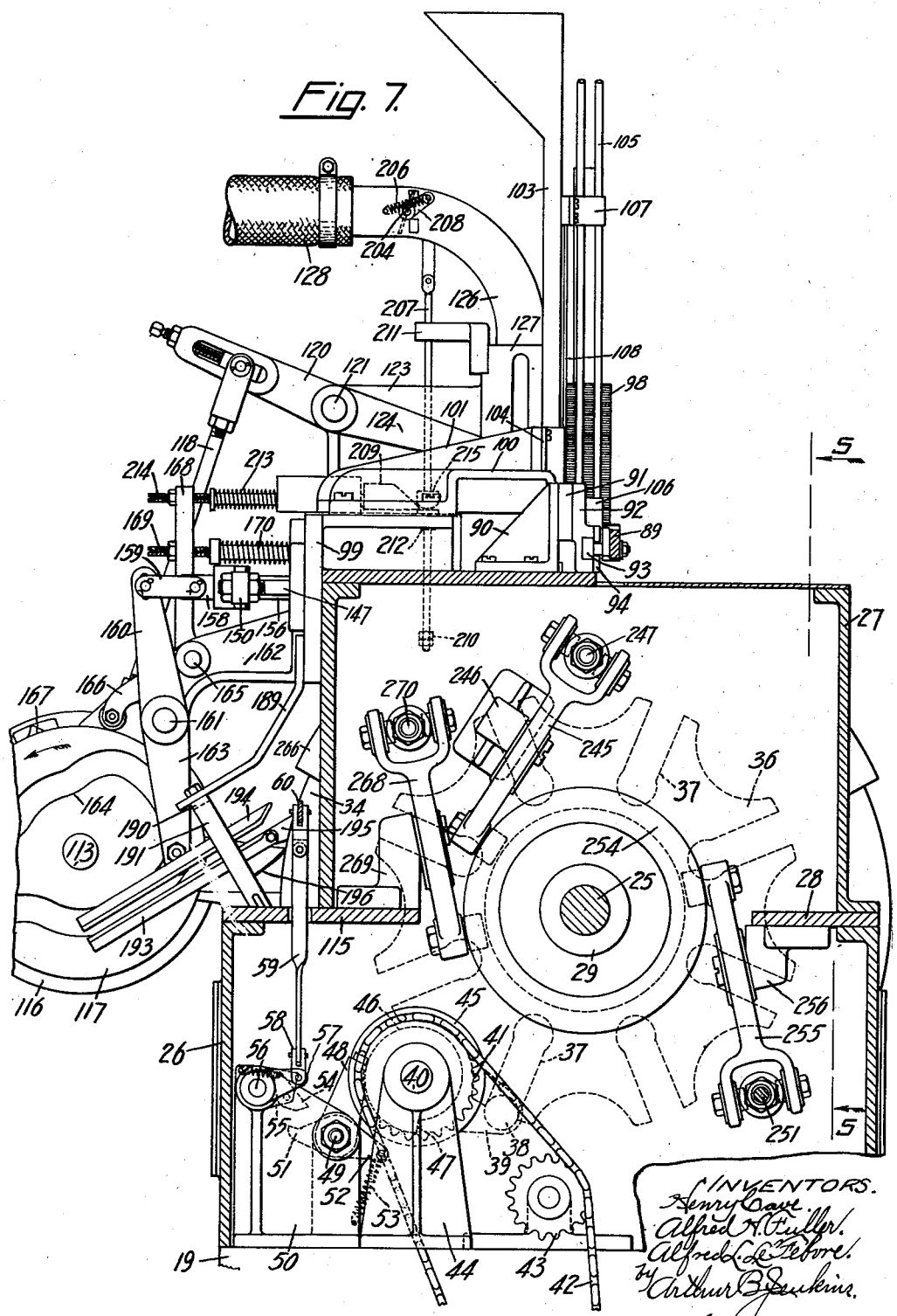
Figure 7 is a view similar to Fig. 6 but showing the opposite end of the machine from that shown in Fig. 6 and on the broken line 7—7 of Fig. 5.

The turret has an intermittent or step-by-step movement given to it in a well known manner as by means of a geneva movement comprising a star wheel 36 of ordinary construction secured to the turret supporting shaft 29 and having the slots 37 therein engaged by a stud 38 on a crank arm 39 secured to a turret driving shaft 40 mounting a sprocket wheel 41 which receives a sprocket chain 42 passing over an idler 43 and around the sprocket wheel 22 hereinbefore mentioned as shown in Figs. 5 and 7. The shaft 40 is mounted at one end in a bearing in a standard 44 and at its opposite end in a bearing in a wall of the bottom section 26 of the housing hereinbefore mentioned. The sprocket wheel 41 is rigidly connected to the driving member 45 of a one-revolution clutch, said wheel and member being loosely mounted on the shaft 40. The driven member of the clutch is secured to the shaft 40 and includes a stop disk 46 having a nose 47 adapted to strike a stop 48 rotatably mounted on a pivot stud 49 secured to a standard 50 on the table 19 as shown in Fig. 7. Said stop is rigid with a trip 51 having a spring arm 52 to receive a spring 53 for yieldingly holding the stop in the path of the nose 47. The trip 51 is normally held by said spring in the path of a tripping latch 54 pivotally mounted on a latch support 55 secured at one end to a pivot 56, a latch actuating arm 57 being secured to the opposite end of the pivot which is rotatably mounted in the standard 50, said latch being yieldingly held in one position to engage the trip 51 to actuate the latter but yielding to permit return movement of the trip after its actuation of the stop 48, as shown in Fig. 7 of the drawings. A link 58 pivotally attached at one end to the arm 57 and at its opposite end to the lower end of a clutch trip rod 59 connects said arm and trip rod, the upper end of said rod being pivotally attached to one end of a clutch tripping bar 60 comprising two sections united by a pivot rotatably mounted in a bracket 61 secured to an end of the top section 27 of the housing hereinbefore referred to, as shown in Fig. 5 of the drawings. The other section of said bar 60 has a roller riding in contact with a clutch actuating cam 62 secured to a cross cam shaft 63 mounted in bearings in brackets 64—65 secured to the section 26 of said housing as shown in Figs. 3 and 5 of the drawings. The bar 60 is biased into contact with the cam 62 by a spring not herein shown and the shaft 63 is driven by interengaging miter gears 66 from the main cam shaft 25 as shown in said Figures 2 and 3.

*Bristle feed.*—The chucks hereinbefore briefly mentioned are for the purpose of twisting wires with bristles between them, the wires with the bristles between them being laid upon a transfer table by means of which they are presented between the members of each pair of chucks in position for the wires to be grasped by the chucks. The bristles are taken from a hopper in measured lots by a bristle feeding mechanism controlled by a one-half-revolution clutch operated from the cross cam shaft 63. This mechanism comprises a sprocket wheel 67 secured to the shaft 63 and connected by a sprocket chain 68 with a sprocket wheel 69 loosely mounted for rotation on a bristle feed shaft 70 rotatably mounted in bearings in brackets 71 secured in horizontally spaced relation to and projecting from the side of the section 27 of the housing hereinbefore mentioned. The sprocket wheel 69 is rigid with the driving member 73 of a one-half-revolution clutch. The driven member 74 of said clutch has noses diametrically located thereon in position for engagement with the stops 75 slidably mounted in brackets 72 and 76 secured one above the other to the housing section 27.

The clutch just described is controlled in its operations by a clutch cam 77 secured to the cam shaft 63 and which controls the operation of the half-revolution clutch just described by means of a bell crank lever pivotally mounted in an extension 78 from the bracket 65, one arm 79 of said lever being in contact with the cam 77 and the other arm 80 of said lever being connected by a rod 81 with an arm 82 secured to one end of a pivot shaft 83 mounted in a web extending from the end of the lower bracket 76, as shown in Figs. 3 and 5 of the drawings. A bell crank lever is secured to the opposite end of said pivot and comprises an arm 84 engaged with the lower stop 75 hereinbefore referred to and the other arm 85 of said bell crank being pivotally connected to one arm 86 of a similar bell crank pivotally mounted in a web at the outer end of the upper bracket 76, the other arm 87 of the last mentioned bell crank being engaged with the upper stop 75, as shown in Fig. 5.

A crank arm 88 for operation of a bristle slicing bar is secured to the shaft 70 and a connecting rod 89 is pivotally attached at one end to said arm and at its opposite end to a slicing bar now to be described.

Figure 2:
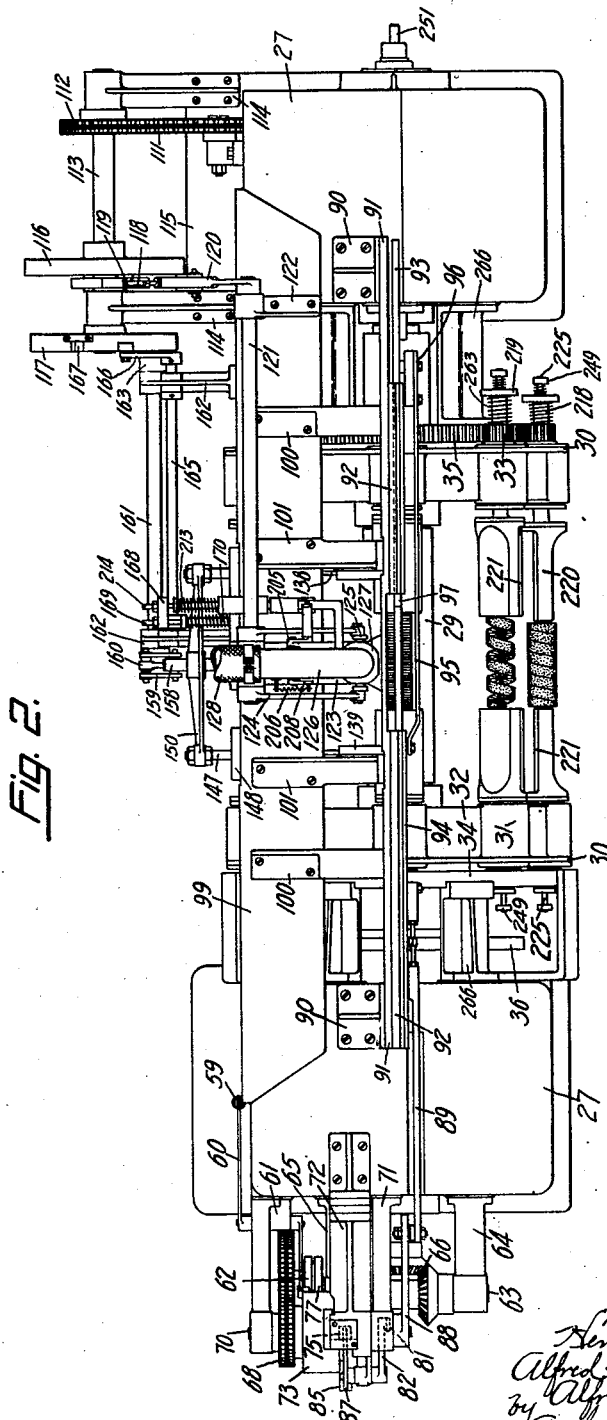
Figure 2 is a plan view of the same with supply sources removed.
Figure 3:
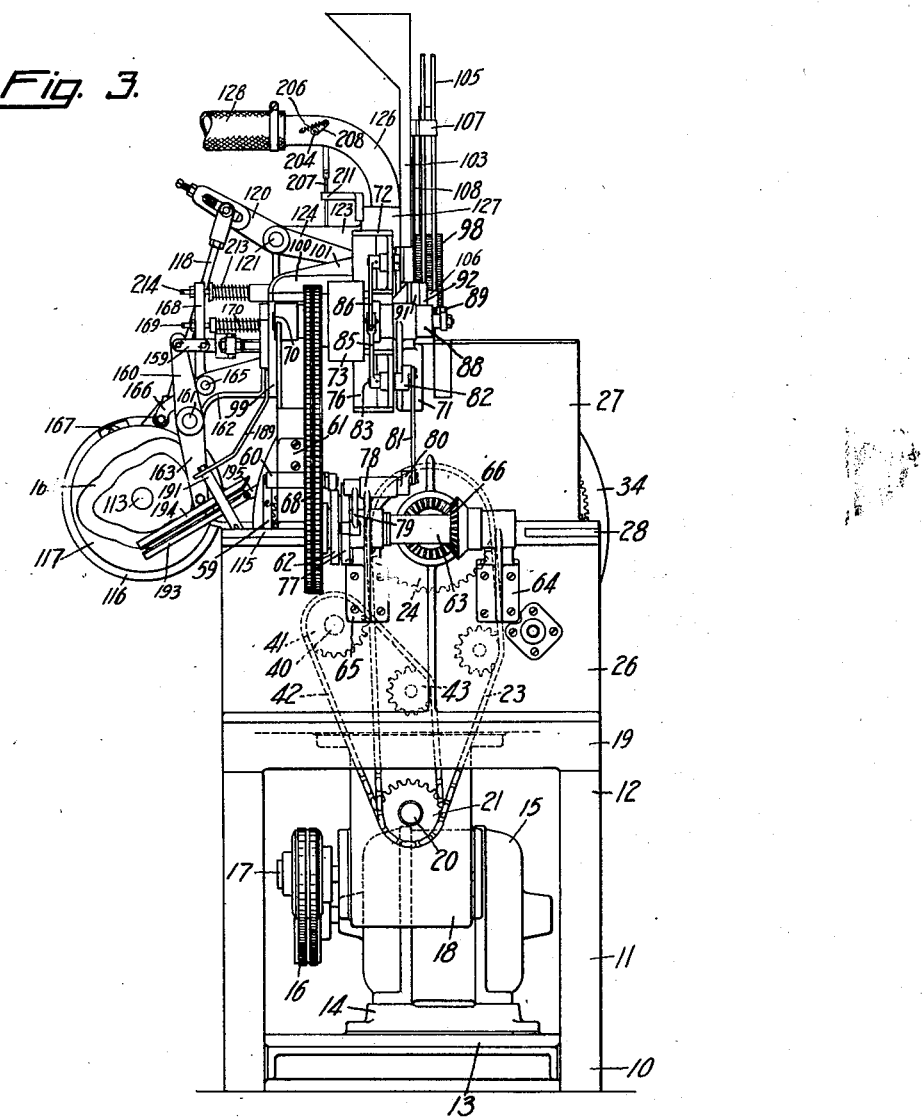
Figure 3 is an end view looking at the end of the machine located at the left in Fig. 1.
Figure 11:
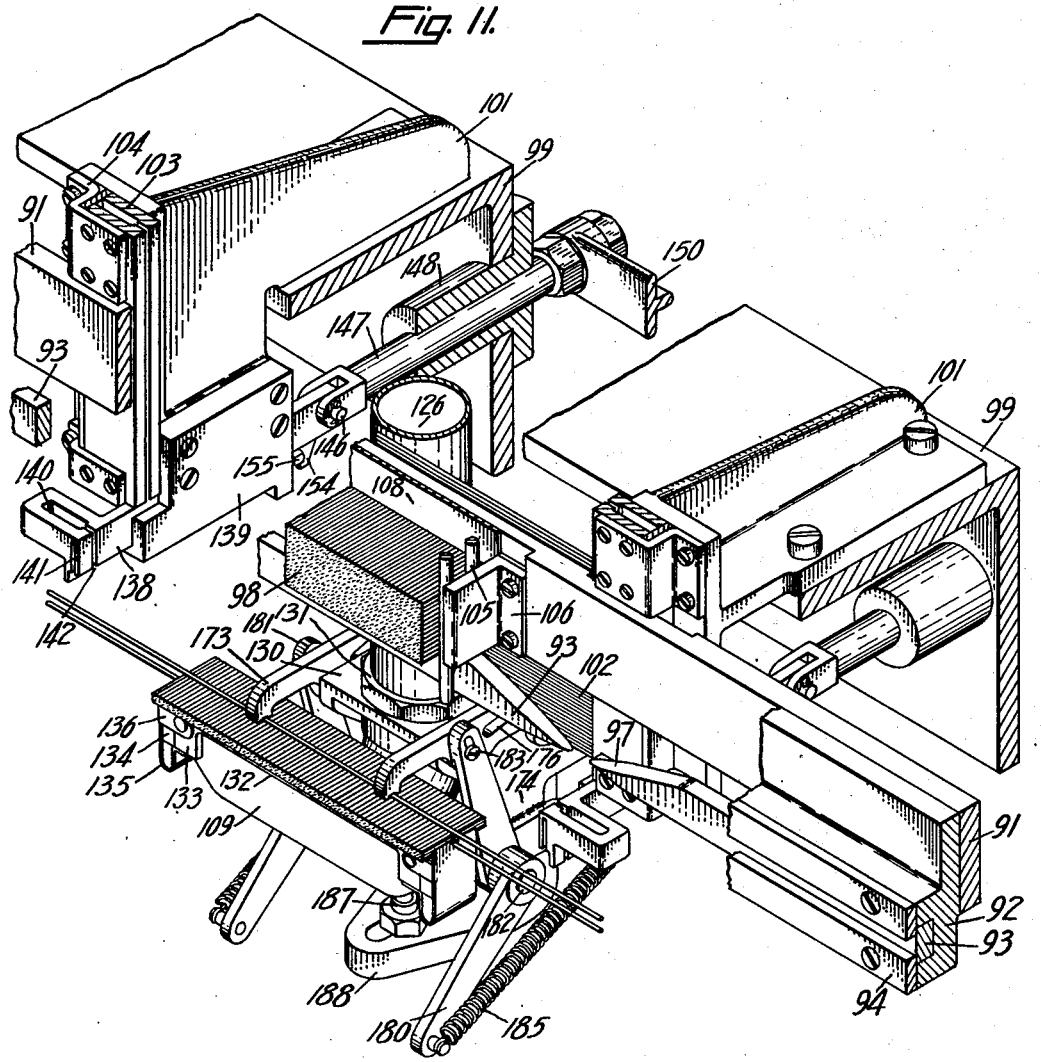
Figure 11 is a perspective view, scale still further enlarged, illustrating mechanism for assembling the bristles and wires with the central portion of the figure broken out to show construction.

Supporting brackets 90 are secured to the top sections 27 of each of the housings hereinbefore referred to and a supporting plate 91 for a slicing bar and other mechanism is secured at its opposite ends to said brackets, as shown in Fig. 2. Grooved slicing bar supports 92 are secured to the plate 91, the inner ends of said supports being spaced apart at the lengthwise center of the machine. A slicing bar is slidably mounted in the grooves in the supports 92, this slicing bar comprising two sections 93 spaced a slight distance apart at their adjacent ends and held in place by gibs 94 in an ordinary manner, as shown in Figs. 2, 7 and 11. The adjacent ends of the slicing bar sections are tapered to sharpened edges and said sections are united by a tie bar 95 secured at its opposite ends to the sections, an adjustable securing means being employed at one end, this being shown at 96 at the righthand end in the drawings herein. The tapered ends provide a depression or cavity 97 into which the bristles settle under the influence of a weight (not herein shown). As the slicing bar traverses the bottom of a stack 98 of bristles the sharpened ends slice off a layer of bristles as shown in Fig. 12, and in a manner to be hereinafter described.

A supply of bristles and wires of which the brushes made by the machine are composed is deposited in vertically arranged chutes in the lengthwise center and top of the machine for the supply of such material to the pairs of chucks as they are successively moved by the turret to positions at its top, as shown in Fig. 1. A supporting plate 99 of angle iron is secured at its ends to the top sections 27 of the housings hereinbefore referred to, as shown in Figs. 2 and 11 of the drawings, and supporting brackets 100 for the plate 91 intermediate its ends and supporting brackets 101 for the bristle and wire supply mechanism are secured to the top of said plate 99. A chute for the stack of wires 102 comprises posts 103 secured at their lower ends to flanges on the brackets 101 as by means of clips 104, said posts being spaced apart substantially the length of the wires and having grooves extending vertically therein for the reception of the ends of the wires, as shown in Figs. 11 and 15. The support for the stack 98 of bristles comprises four rods 105 arranged in pairs near opposite ends of the stack as shown in Figs. 12 and 13, said rods being secured as by welding to clips 106 of angular shape attached as by means of screws to the supporting plate 91. The posts 103 and rods 105 are further supported by a strap 107 at a distance above the bottom as shown in Figs. 1 and 7, said strap being secured at its ends to the posts 103. A plate 108 for the support of the bristle stack on their back ends is secured at its bottom to the clips 106 and upwardly thereof to the strap 107, this plate being for the purpose of aligning the ends of the bristles in the stack. A carrier 109 is mounted for vertical reciprocating movement underneath the stack 98 of bristles, a layer of bristles with wires on opposite sides thereof being deposited upon the carrier and the latter being operated by mechanism now to be described.

Figure 6:
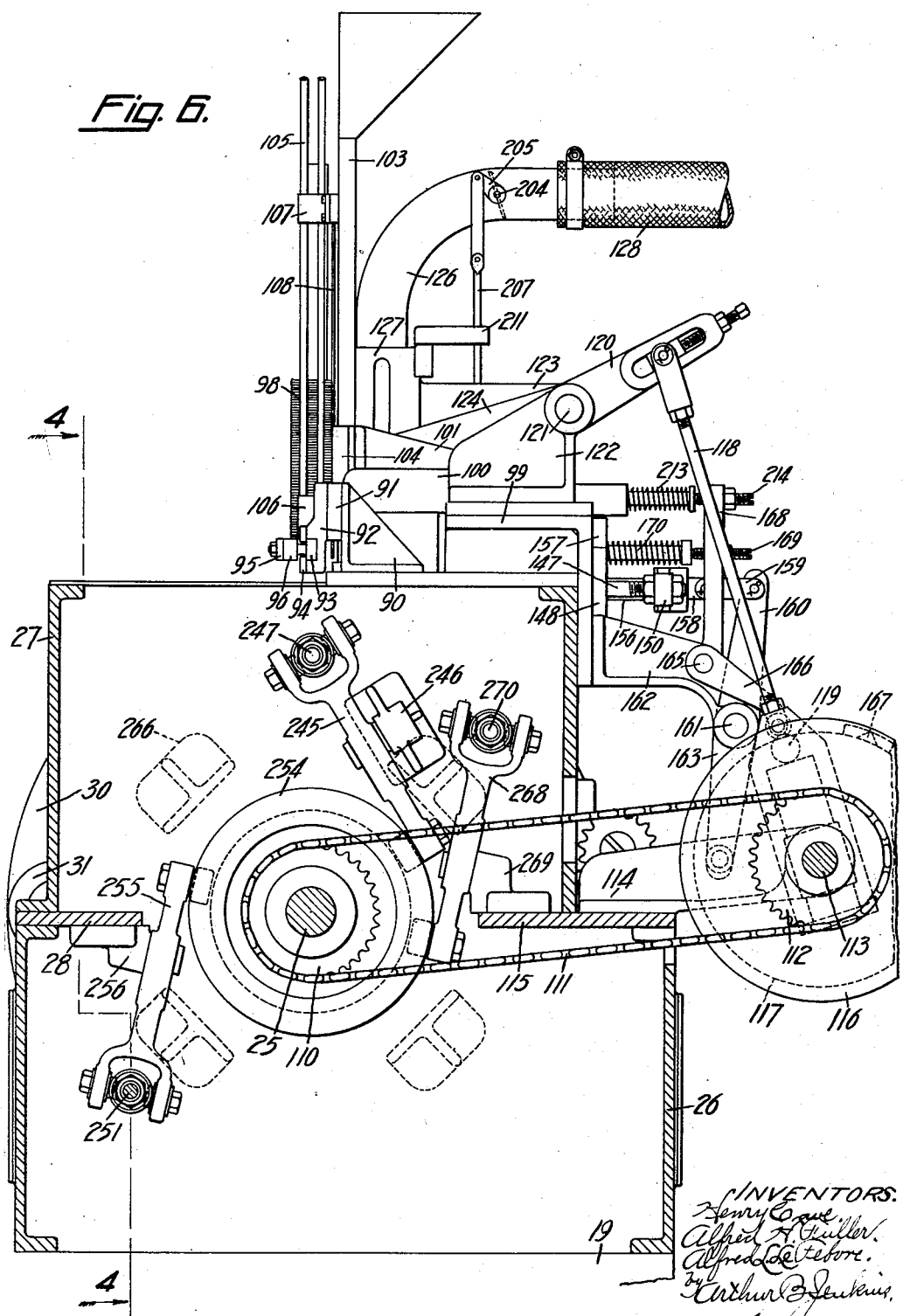
Figure 6 is a view in section on a plane denoted by the broken line 6—6 of Fig. 4.

A sprocket wheel 110 is secured to the cam shaft 25 as shown in Fig. 4 of the drawings and a sprocket chain 111 extends from said wheel to a sprocket wheel 112 secured to a cam shaft 113 mounted in bearings in bracket arms 114 secured to and extending from a plate 115 secured between the two sections 26—27 of the housings as shown in Fig. 6 of the drawings. The cam shaft 113 has a carrier operating cam 116 and a wire feed cam 117 secured thereto. A carrier operating rod 118 is forked at one end to straddle the shaft 113 the fork being of rectangular shape to receive a square bearing block loosely mounted on the shaft 113 as shown in dotted lines in Fig. 6. The fork carries a roller 119 located in a groove within the cam 116, this cam being shaped to properly operate the rod the end of which is secured to an arm 120 secured at its end to a carrier rock shaft 121 journaled in brackets 122—123 secured to the supporting plate 99 as shown in Figs. 2 and 6 of the drawings. The shaft 121 has carrier supporting arms 124 extending therefrom on opposite sides of the bracket 123, the ends of the arms being connected by links 125 with a carrier supporting tube 126 mounted for vertical sliding movement in a hub 127 comprising a part of the bracket 123, said tube having a flexible connection 128 with a source of suction (not shown), as seen in Figs. 3, 7 and 10, the mounting of the tube 126 being shown in Figures 10 and 15 and others.

Figure 12:
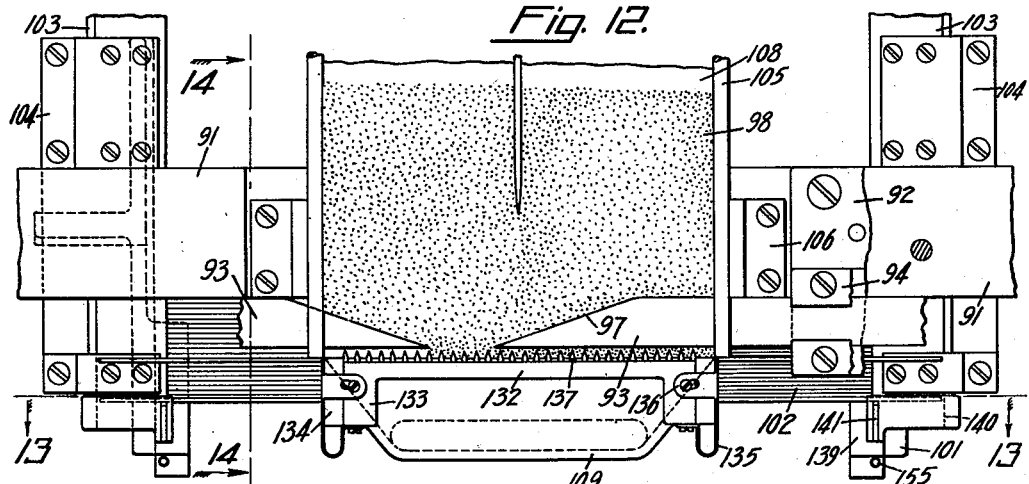
Figure 12 is a view on the same scale as Fig. 11 illustrating the operation of the slicing bar.
Figure 13:
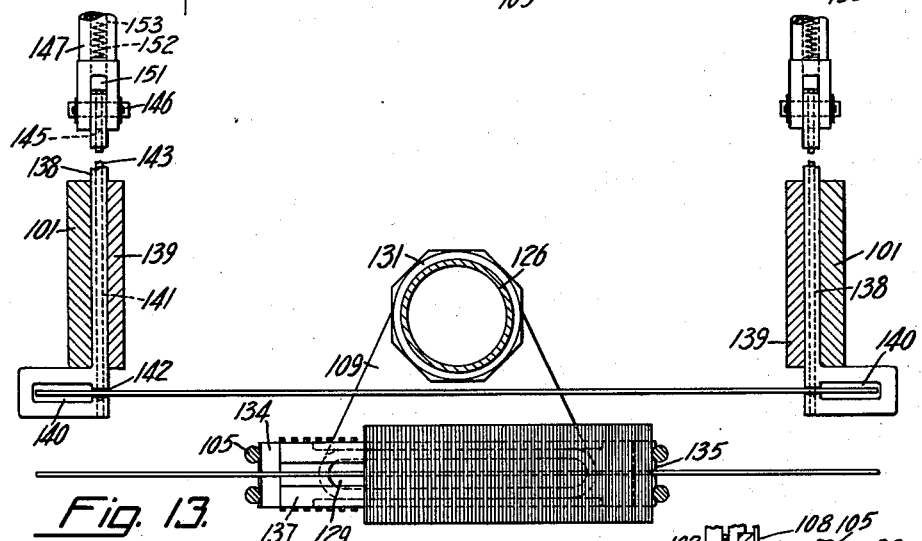
Figure 13 is a view on a plane denoted by the broken line 13—13 of Fig. 12.
Figure 14:
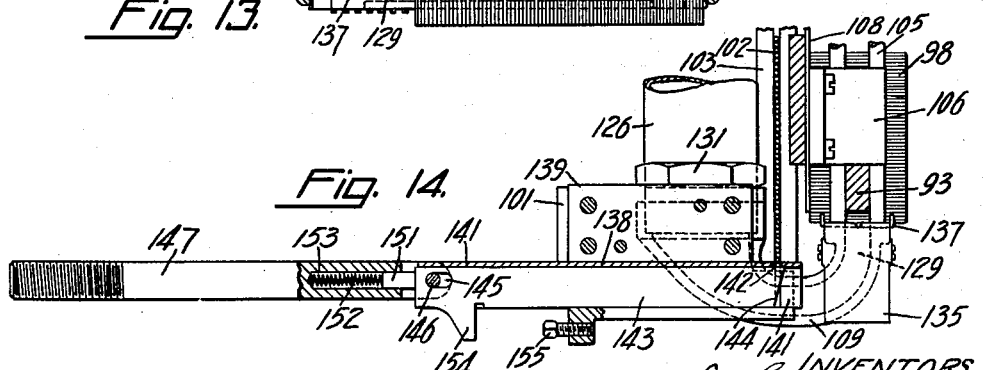
Figure 14 is a view on a plane denoted by the broken line 14—14 of Fig. 12.

The carrier 109 has a round threaded opening at one end to receive the threaded end of the tube 126, the carrier and the opening therein gradually spreading outwardly to a mouth 129 at that end opposite the connection with the tube 126 as shown in Figs. 12, 13 and 14. A seat 130 of a bracket for supporting a presser mechanism to be presently described is secured between the end of the carrier and a lock nut 131 for securing the parts together. The carrier terminates in a table 132 at its front end with lugs 133 for supporting blocks 134 of rubber or similar material for packing the ends of the slot at the mouth of the carrier against leaking of air, said blocks being held in place by resilient holders 135 secured to the bottom of the lugs 133 as by means of screws entered through slots in clips 136 as shown in Fig. 12. A toothed retainer 137 having rows of teeth on opposite edges is secured to the top of the table to maintain the arrangement of bristles on the table, as shown in Figs. 12 and 13 of the drawings. This retainer or retaining plate 137 has a slot opening into the mouth of the carrier to connect with a source of reduced air pressure from within the carrier to the layers of bristles upon the plate in a manner to be presently shown in a description of the operation of the machine.

*Wire feed.*—Wire carrying bars 138 are mounted for reciprocating sliding movement underneath the opposite ends of the stack 102 of wires, said stack being supported by said bars, as shown in Figs. 12 and 14. These bars slide in grooves in the sides of plates 139 secured by screws to the sides of the brackets 101, as shown in Fig. 11, holes being thus formed through which said bars extend. The ends of the bars are formed with wire receiving pockets 140 into which the wires enter in a manner to be hereinafter described. A hole 141 extends lengthwise within each bar across a slot 142 into each pocket and to the opposite end of the bar. A wire feed control 143 is located for sliding controlling movement in each of the holes 141, the controlling ends of these controls being cut back on bevels 144 and being adapted to pass to opposite sides of the slots 142. The opposite ends of the controls have slots 145 to receive pins 146 for uniting the bars 138 with wire feed actuating bars 147, the ends of said bars being forked to receive the ends of the said bars 138, as shown in Figs. 11 and 13. Said actuating bars are mounted in bearings 148 supported in the plate 99 and a yoke 150 connects the ends of the actuating bars 147. A stem 151 extends from the end of each feed control into contact with a spring 152 in a hole 153 extending inwardly from between the forks of each of the actuating bars, as shown in Fig. 14. Releasing lugs 154 on the feed controls 143 are adapted to engage stop screws 155 screw threadedly engaged with a lug on the brackets 139, as shown in Fig. 14. A guide 156 extends through a bearing 157 secured in the flange of the plate 99.

A stub 158 from the guide 156 which extends through the yoke 150 is connected by links 159 with a wire feed actuating lever 160. The lever 160 is secured to one end of a wire feed shaft 161 mounted in bearings in brackets 162 secured to and extending from the flange on the supporting bar 99 near opposite ends of the shaft as shown in Figs. 2 and 10. A wire feed actuating arm 163 is secured to and extends downwardly from the end of the shaft 161 opposite the lever 160 and has a roller engaged in a cam groove 164 in the wire feed cam 117.

A presser actuating shaft 165 is mounted in the brackets 162 adjacent the shaft 161, one end of this presser actuating shaft having an actuating arm 166 with a roller in engagement with the periphery of the cam 117 for engagement by a cam 167 on said periphery for momentary release of a presser to press a wire upon the top of a layer of bristles on the carrier in a manner to be hereinafter described. The end of the shaft 165 opposite the arm 166 has a presser actuating lever 168 secured thereto and has an adjusting screw 169 to engage the end of a spring pressed plunger 170 having a release actuator 171 adapted to engage a roller on a presser release lever 172. Pressers 173 are located on opposite sides of a bracket 174 secured to the supporting tube 126 by means of the seat 130 hereinbefore mentioned, these pressers being pivotally actuated by pins 175 entered through irregularly shaped slots 176 in the pressers, as shown in Figs. 10 and 15. Each presser has a notch 177 on its lower edge adapted to be engaged by a trigger 178 secured to one end of a trigger operating shaft 172' mounted in ears in the bracket 174 and to the other end of which shaft the lever 172 is secured as shown in Fig. 16. The bracket 174 which is mounted on the carrier 109 and tube 126 is supported in its movements by a guide 179 secured to the horizontal part of the supporting plate 99 and between said plate and the bracket 123 as shown in Figs. 15 and 16. A presser actuating arm 181 is secured to each end of a presser actuating shaft 182 journaled in the opposite side parts of the bracket 174. The arms 181 have at their outer ends slots to receive pivot pins 183 secured to and extending from the sides of the pressers 173 as shown, in Fig. 15. Springs 184 secured at their opposite ends to the pressers 173 and to the actuating arms 181 draw the pressers downwardly and clamp the bristle mass and wires against the carrier when the pressers actuated by springs 185 secured at their opposite ends to the spring arms 180 and to the bracket are moved to their active positions, see Fig. 15. A stop 186 located in the path of a stop pin 187 secured to and projecting upwardly from a foot 188 at the lower end of the carrier guide 179 operates to reset the parts in the positions shown in Fig. 10.

The operation of the machine thus far described is as follows:

A layer of bristles held between two wires having been placed by the carrier in position for opposite ends of the wires to be grasped by oppositely disposed chucks at Station No. 1 at the top of the turret, and the wires having been secured by the chucks for a twisting operation in a manner to be hereinafter described, the carrier is seen in its lowermost position to avoid interference with the movement of the turret to position the next succeeding pair of chucks to receive another load comprising two wires with a layer of bristles between them, as shown in Fig. 10. The cam 62 has just operated the lever 60 which through the trip rod 59 operated the trip mechanism shown in Fig. 7 to withdraw the stop 48 from the nose 47 of the one-revolution clutch thereby permitting action of the driving member 45 of the clutch to operate the turret driving shaft 40. This operation has started rotation of the crank arm 39 and the stud 38 is seen in Fig. 7 as entering the mouth of a slot 37 in the star wheel 36 to impart a one-step movement to the turret, at the end of which movement the stop 48 engaging the nose 47 will release the clutch in a manner well known and the one-step movement of the turret will cease with a pair of empty chucks in position to receive a load comprising two wires with a layer of bristles between them.

During the start of this indexing of the turret the cam 116 (see Fig. 10) through its connection including the rod 118 with the carrier supporting arm 124 retains the carrier in its lowermost position until the load held by the chucks in the first position at the top of the turret is moved to the right sufficiently to clear the carrier in its upward movement which movement will also move the carrier above the path of the advancing pair of chucks to receive their load and at the station at the top, as shown in Figure 10. During this interval the cam 117 operating through the connection including the wire feed actuating arm 163, shaft 161, wire feed lever 160, yoke 150 and bars 147 moves the wire carrying bars 138 from the position shown in Fig. 14 to their forward positions as shown in Fig. 15, but with the wire feed controls 143 retained in their positions relative to the bars 138 as shown in Fig. 14. This movement carries a wire forward into the path of upward movement of the carrier. The cam 116 continues movement of the carrier to its full height as seen in Figs. 12 and 14 in which movement the carrier encounters the wire on the wire carrier and moves it upwardly to the positions shown in Figs. 12 and 13 and in position to receive thereon a layer of bristles.

While the carrier is in its raised position as just described the clutch cam 77 operating through the bell cranks 79—80, rod 81, and arm 82 with the other connections operates one of the stops 75 to release the driving member of the half-revolution clutch, thereby establishing operation of said clutch to rotate the bristle feed shaft 70 and the crank arm 88 with the connecting rod 89 to shift the slicing bar 93 to the position shown in Figs. 4, 5 and 11. As the cavity 97 between the two sections of the slicing bar passes under the stack 98 of bristles the bristles are collected in a sheet or layer upon the carrier as illustrated in Fig. 12, the slicing bar, however, in this figure being illustrated as moving in the opposite direction from that just stated, the half-revolution clutch at one operation moving the bar in one direction only and in the next operation moving said bar in the opposite direction, a layer of bristles being deposited upon the carrier in each of said movements of the slicing bar and each of said movements of the slicing bar taking place during each one-step movement of the turret of the machine.

When a layer of bristles has been deposited upon the carrier as just described the cam 116 operates with the mechanism hereinbefore mentioned to lower the carrier to the position shown in Figs. 4, 5, and 11. In this position the cam 117, through the connections hereinbefore described, operates the wire feed actuating bar 147 to move it from the position shown in Fig. 14 to the position shown in Fig. 11. In this operation the cam 117 is shaped to move the bar 138 a short distance further than hereinbefore described in delivering the first wire on to the carrier before the layer of bristles was deposited thereon. This further movement moves the releasing lugs 154 against the stop screws 155 before the carrying bars 138 reach their limit of movement. The wire feed controls 143 being thus stopped, the slots 142 in the bars 138 are uncovered and the wire in said slots drops on to the layer of bristles on the carrier as shown in Fig. 11. Immediately following this deposit of the second wire on top of the layer of bristles on the carrier the pressers 173 are moved into engagement with the top wire to hold it down upon the top layer of bristles as shown in Fig. 11. This movement of the pressers is influenced by contact of the releasing actuator 171 carried by the plunger 170 which is actuated by the cam 167 through the arm 166, presser actuating shaft 165, and presser actuating lever 168 to move the plunger forward from the position shown in Fig. 10. This operation releases the triggers 178 from the notches 177 whereupon the springs 185 acting upon the levers 180 swing the actuating arms 181 forward to the positions shown in Fig. 15. In this lengthwise movement of the pressers the cam slots 176 in connection with the pins 175, the pressers being pivoted by the pins 183, move the pressers upwardly and then downwardly in a curved path to engage the wires in the position shown in Figure 15, and said cam slots and pins in a reverse movement of the pressers will move the latter upwardly, rearwardly, and then downwardly into the position shown in Figure 10. This reverse movement being started by the downward movement of the carrier from its position shown in Figure 15 to its lowermost position shown in Fig. 10 lowers the bracket 174 and causes the stop 186 to encounter the stop pin 187 thereby rotating the presser actuating shaft 182 and consequently the swinging arm 181 to move the pressers backwardly to their inoperative positions during the downward movement of the carrier to its lowermost position. This completes the operation of loading the carrier with a layer of bristles deposited between the two wires and with this load in the position shown in Fig. 15 to be grasped by the chucks at opposite ends of the wires, as soon as the wires are grasped the carrier being lowered from the position shown in Figure 15 to the position shown in Figs. 1 to 10 as hereinbefore related.

As hereinbefore mentioned the pinions 33 at opposite ends of the turret mesh with the gears 34—35, one being an internal ring gear and the other a common gear, so that the chucks which the pinions operate are rotated in opposite directions to twist the wires. The gears 34—35 by reason of their differences in construction being of different sizes and the pinions 33 of each pair of chucks being in axial alignment the teeth of the pinions and gears at opposite ends of the turret are so arranged that their gear ratios are the same and the chucks at the loading and unloading stations are always in proper positions for the slots 223 therein to permit free discharge of the twisted brushes and the reception of loads of bristle masses and wires although no effort has been made in the drawings herein to bring out in detail this gear ratio arrangement. As hereinbefore described the chucks are loaded with the wires and the bristles at the No. 1 station at the top of the turret as shown in Figs. 4, 5 and 10. The turret is rotated by a step-by-step movement as hereinbefore described and from the No. 1 station located at the top as seen in Figure 10 the wires are partially twisted in their movement to the second station the next at the right, as seen in Figure 10. In the movement of the turret to the next or third station further twist is imparted to the wires, and in the movement from the third to the fourth station still further twist is given to the wires. The chucks to be presently described are so arranged that the wires are first grasped by the chucks in a position close to the bristles so that the wires are twisted as to the central portion containing the bristles and this takes place in the movement of the turret from the first to the fourth station. At this point the chucks are operated to grasp the wires at the extremities and the wires are then twisted as to the outer ends, being that portion free from bristles, in the next four step-by-step movements from the bottom to the next to the top or eighth station at the left, as shown in Figure 10. The free ends of the wires take a little more twist than the parts containing the bristles and this increased twist is given in the four step-by-step movements from the fourth to the eighth stations, whereas the parts containing the bristles were fully twisted in the three step-by-step movements from the first to the fourth stations. The chucks are now operated to release the wires and the latter are discharged by mechanism as follows. A supporting strap 189 is secured to and extends downwardly from the vertical flange on the supporting plate 99 being secured at its lower end to the top 190 of a discharge frame including sides 191 extending from the top downwardly and secured at their lower ends to the bottom sections 26 of the housings located at opposite ends of the turrets as hereinbefore described, and as shown in Figs. 7 and 10 of the drawings. A cross member 192 of said frame supports one end of lower track members 193, upper track members 194 of the track composed of said members being supported by the top 190 of the track supporting frame. A pivoted member 195 of said track comprising a bottom and side tracks at opposite ends of said bottom is pivotally attached at the lower ends of said tracks to the lower track members 193 and a spring 196 secured to and projecting from the supporting frame into contact with the bottom of the pivoted member 195 biases said member to its lower and normal position. Ejectors 197 are located at the free ends of ejector springs 198 secured to brackets 199 attached to the inner surface of the flange of the supporting plate 99 as shown in Fig. 10. A support 200 is secured to the brackets 199, as shown between the brackets and the springs 198, said support being curved downwardly and having track flaps 201 extending from its opposite edges and the upper edges of said flaps extending in line with the upper edges of the track members 195. A track stop 202 extends from the lengthwise center of the support 200 underneath the free end of each pivoted track member 195.

In operation the brushes pass upwardly from station No. 7 at the diametrically horizontal center on the back of the turret as shown in Fig. 10, encountering the bottom of each track member 195 and forcing said members upwardly against the tension of the spring 196 and to the position shown in dotted lines in Fig. 10, the brushes carried by the turret passing underneath the bottom of said track member and into the curved support 200, encountering the bottom edges of the ejectors 197 that are forced upwardly against the tension of the springs 198, at this point the brushes being still held by the chucks. The chucks now releasing the brushes, the ejectors force the brushes out of the chucks through slots 203 therein, the wires at opposite ends of the brushes passing on to the upper edges of the track flaps 201 from whence they roll on to the upper edges of the sides of each pivoted track member 195 which member has been returned to its lowered position against the stop 202 immediately upon passing of the brushes upwardly into the support 200. From the edges of the track member 195 the brushes travel downwardly into and along the slots between the track members 193—194 from the ends of which slots said brushes may be delivered into a container placed for their reception but not herein shown.

By mechanism to be now described suction is automatically created in the carrier 109 through the tube 126 and connection 128 to retain the bristles in place on the carrier while it is being lowered away from the stack. This is obtained by vacuum transmitted from the connection 128 to the carrier 109 when the latter is in its raised position shown in Figs. 12 and 14 and is continued until the carrier reaches its discharging position as shown in Fig. 11 at which time the vacuum is shut off. This is effected by means of a valve on a shaft 204 to one end of which a valve operating arm 205 is secured, the other end of the shaft having secured thereto an arm 208 with a spring 206 attached at one end and at its opposite end to the tube 126 in such position that the spring will be swung to opposite sides of the shaft 204 in the movement of the arm, thereby effecting a snapping movement of the valve in opposite directions as the spring passes the axis of the shaft 204. A valve operating rod 207 attached at its upper end to the arm 205 passes downwardly loosely through a rod supporting lip 211 attached to the upper end of the carrier supporting hub 127, said rod comprising two sections pivotally connected as shown in Fig. 7. The lower section passes through said support and also through a plunger 209 and through the horizontal portion of the supporting plate 99, actuating stops 210 in the form of nuts being secured to the lower end of the rod and the opening for said rod in the plunger being a slotted opening so that the plunger may have a movement laterally of the rod. This lower section of the rod also passes through a supporting lip 211 extending laterally from the hub 127. The plunger 209 extends through a bearing 212 mounted on the horizontal portion of the supporting plate 99, said plunger being actuated in one direction by a spring 213 and in the opposite direction by an adjusting screw 214 in the upper end of the presser actuating lever 168.

In operation, when the carrier is moved to its uppermost position shown in Figs. 12 and 14 the presser actuating lever 168 and the pressers are in their inoperative positions as shown in Fig. 10. This upward movement of the carrier also effects upward movement of the connection 128 and the valve operating rod 207 carried thereby. Just before these parts reach the limit of their upward movement the stops 210 strike the under side of the horizontal portion of the supporting plate 99, thereby swinging the arm 205 downwardly carrying the spring 206 past the axis of the shaft 204 and snapping the vacuum valve to its open position and creating vacuum in the carrier as it reaches its upward position in contact with the stack of bristles. This vacuum is maintained during downward movement of the carrier to its position shown in Figs. 10, 11 and 15, thereby retaining the bristles in place on the carrier. Immediately upon the carrier reaching this position the cam 167 through the connections hereinbefore described operates the presser actuating lever 168 to move the release actuator 171 and release the triggers 178 from the notches 177, thereby permitting the springs 185 to move the pressers into the positions shown in Fig. 15 and against the top wire upon the bristle mass. This movement of the actuating lever 168 thrusts the plunger 209 against the block 215 thereby moving the valve operating rod 207 upwardly carrying the spring 206 past the axis of the shaft 204 and snapping the valve to its closed position, thereby terminating the vacuum in the carrier, it being noted that as said carrier was moved from its uppermost position to its intermediate or discharge position shown in Figs. 10, 11 and 15 the stop 210 was lowered from contact with the horizontal portion of the supporting plate 99. It is thus seen that movement of the actuating lever 168 simultaneously, or nearly so, effected movement of the pressers into contact with the top wire on the bristle mass and release of the vacuum upon such mass, thereby permitting the carrier to be moved downwardly as the chucks grasped the wires in a manner now to be described.

In the machine herein shown there are eight chucks equally spaced on the turret, each pair comprising chucks located opposite each other at opposite ends of the turret. As hereinbefore explained, each chuck is rotatably mounted in a boss on the turret and the chucks at opposite ends of the turret are rotated in opposite directions by means of pinions 33 meshing with gears 34—35, the gear on the left as shown in Fig. 5 being a ring gear. The chucks of themselves are all alike but the mounting is a little different in that the chucks on the right as seen in Fig. 4 are movable lengthwise while those on the left as shown in Fig. 5 have no lengthwise movement. The lengthwise movable chucks shown on the right hand end of the turret, see Figure 4, are all of the same construction and a description of one will suffice for all. A ball bearing 216 of any suitable construction lies within the opening in the boss 31 and supports a sleeve 217 at the exposed end of which the pinion 33 is a part. A chuck spindle 218 extends through said sleeve, the sleeve and spindle being connected by a spline and the outer end of the spindle having a disk 219 secured thereto to take the thrust of a spring located between the pinion and disk, as shown in Fig. 4. A chuck body 220 is secured to the end of the spindle, said body having a cover 221 secured to its side to enclose a chamber 222 therein, said cover having a slot 223 for admission of the wire ends into said chamber and for ejection therefrom. A jaw actuating fork comprises two branches 224 pivotally attached to the head on the end of a jaw actuating spindle 225 extending through a bushing in the chuck spindle 218, as shown in Figs. 17 and 18. The branches 224 have tangs pivotally supported upon a screw threaded bushing 226 mounted in the head of the spindle 225 and retained by a screw as shown in Fig. 18. Said jaw actuating fork is mounted for reciprocating sliding movement within the chamber 222 and the spindle 225 extends outwardly from within said chamber through the chuck spindle 218 as shown in Figs. 17 and 18. Jaw actuating cams 227 are secured to the inner faces of the branches 224 of the fork to actuate chuck jaws 228 mounted at their lengthwise centers for rocking movements upon pivot screws 229 secured in the chuck body and projecting across the chamber 222 and through slots in the chuck jaws, as shown in Fig. 17. The chuck jaws are double-ended and have rocking movements upon the pivots as well as limited lengthwise movements provided by the pivot screws and slots. Each end of each jaw supports a gripping member 230 having an ear extending into the slotted end of the jaw and pivoted therein for limited rocking movement to adjust itself to squarely engage the wires held by said members. A pair 231 of wire positioning jaws are mounted upon a pivot 232 extending lengthwise within the chuck body 220, as shown in Fig. 18, each of these jaws having actuating fingers 233 the jaws and fingers of each member being located on the same side of the pivot 232. Jaw actuating cams 234 are secured to the jaw actuating cams 227 so that they lie on opposite sides of the positioning jaws 231. Positioning jaw releasing springs 235 are secured to the chuck body 220 and contact with the actuating fingers 233 to bias the jaws to open position.

A second pair 236 of wire positioning jaws are pivotally mounted on the pivot 232 as shown in Figs. 18 and 21, these jaws acting in a manner similar to a pair of scissors, the jaw members including actuating fingers 237 crossing each other at the pivot and the jaws being biased to closed position by a spring 238 secured at its opposite ends to pins on the ends of the fingers 237, as shown in Fig. 21. These jaws 236 are opened by means of cams 239 on the edges of slots in cam plates 240 located in a recess in the cover, as shown in Fig. 18. Disks 241 having cam slots 242 are secured to the body of the chuck, said slots receiving pins 243 projecting from the sides of the inner ends of the chuck jaws to force the chuck jaws forward as their outer ends are swung together to grasp the wires, this forcing the outer ends of the jaws into close contact with the bristles to closely compact the ends of the mass of bristles and prevent any disarrangement thereof during the twisting of the wires to secure the bristles. Each chuck as it is revolved into position to receive a bristle mass composed of bristles and wires as hereinbefore explained has its slot 223 opening upward so that as the carrier containing the bristle mass is lowered the projecting ends of the wires at each end of the brush sink into the slot between the faces 230 of the gripping jaws and between the two pairs of positioning jaws, all of said jaws being open at this time. The jaw actuating spindle 225 is now moved forward by mechanism to be presently described carrying the branches of the fork 224 forward toward the end of the chuck, bringing the jaw actuating cams 227 into contact with the back of the heads of the gripping jaws at the forward end of the latter, thereby forcing the gripping jaws toward each other to grasp the wires. Just before this gripping action of the gripping jaws, however, the wire positioning jaws 231 were actuated by the cams on the forward edges of the cam plates 234 to force the jaws 231 together and thereby close the wires together in proximity to each other so that the wires will be closely associated when secured by the gripping jaws. The chucks of each pair now being rotated in opposite directions the wire is twisted as to that portion between the gripping jaws on each of the chucks of the pair. This twisting operation shortens the brush structure by reason of the twisting and the chucks with their spindles at the righthand end of the turret are drawn inwardly against the tension of the springs on the outer ends of the spindles presently to be described. Referring to the same pair of chucks, when they reach a certain point in the step-by-step rotation of the turret the spindles 225 are drawn backwardly carrying the branches of the fork, together with the cams 227 and 239, thereby causing the slots 242 and the pins 243 to move the chuck jaws backward into the chuck body, as shown in Fig. 27. Pins 239' at the tips of the jaws 236 upon reaching the cams 239 move toward each other by action of the springs 238 to position the wires close together, and promptly the rear ends of the cams 227 engaging the heads of the rear clamping jaws force them together to grasp the wires at their extremities. In a reverse movement the cams 239 separate the jaws 236 and release the wires. The twisting of that portion of the wires between the bristles and the ends of the wires now takes place, the righthand chucks of the pair moving toward the other chuck to compensate for the shortening of the wire in the twisting operation. When the pair of chucks reaches the last station in the rotation of the turret the spindles 225 are forced inwardly in a manner presently to be described, thereby releasing the chuck jaws from the wires by a reverse action of said jaws to that just described and the slots 223 of the chucks opening downwardly the wires are forced outwardly from the chuck by the ejectors 197 as hereinbefore described, it being noted that at this time all of the chuck jaws are placed in their neutral or open positions.

Cams secured to the cam shaft 25 within the housings at opposite ends of the turret are employed to operate the jaw actuating spindles 225 in a manner as follows, and as each cam at one end of the cam shaft is substantially like that at the opposite end of the shaft except in some instances there may be a slight change in the shape of the cam to effect an advanced or delayed operation of the chuck, a description of that set of cams at the right end of the machine will answer for both: A cam 244 is grooved to receive the roller on the lower end of a chuck actuating lever 245 pivotally mounted in a bracket 246 secured to and projecting from the inner wall of the top section 27 of the housing at the righthand side of the machine as shown in Fig. 4. The lever has an actuating rod 247 extending through a bushing 248 in the wall of the housing and into position for engagement with the outer end of the spindle 225 to push the latter inwardly and operate the chuck to grasp the wires for the initial twisting operation, the two chucks constituting this pair located at opposite ends of the turret operating in unison. From this first station at the top of the turret three one-step movements are imparted to bring the chuck to the position shown at the fourth station at which the bearing of the chuck is shown in section. At this station a button 249 on the end of the spindle 225 is engaged by a claw 250 on the end of a chuck actuating rod 251, said rod extending through a bearing in the rear end of the lower sections 26 of the housing at this end of the machine, through a sleeve 252 supporting a housing 253 within which the claw 250 is enclosed. A cam 254 has a groove to receive a roller on the end of a chuck actuating lever 255 and is pivotally mounted on a block 256 secured to and projecting downwardly from the plate 28, as shown in Fig. 4. The end of the lever opposite the cam engages the chuck actuating rod 251 for operation of the claw 250 to actuate the chuck to reverse the gripping action of the chuck jaws and cause the latter to grip the wires in a position at the outer extremities of the wires.

To position the housing 253 for engagement by the disks 219 at the fourth station to stop backward movement of the chucks at this end of the turret and thereby position the wires even with the inner ends of the chuck jaws at the opposite end of the turret as shown in Fig. 25, spring pressed stops 257 wedge shaped at their free ends are slidably mounted in sockets 258 secured to the outer side of the lower section 26 of the housing and on opposite sides of the housing 253 as shown in Fig. 4. These stops are operated by stop actuating levers 259 pivotally supported by a sleeve 260 secured as by means of screws, not shown, to the inner wall of the housing section 26, said sleeve having ears to which the levers are pivotally attached, said levers having rollers which are operatively engaged by actuating cams 261 extending from a cam supporting plate 262 secured to the actuating rod 251.

As the chuck spindles 218 are thrust backward by springs 263 on the spindles, in order to prevent undue backward movement of said spindles guards 264 are secured in position to receive the disks 219 on the ends of the spindles, as shown in Figs. 4 and 9, said guards being supported by clips 265 secured to and projecting from brackets 266, each bracket being secured at one end to the gear 35 and at its opposite end to the outside of one of the housing sections 26 or 27. As these guards both perform the same function, although they differ a little in shape, the same reference numeral has been given to all. To accurately position the buttons 249 to engage the claw 250 as the chucks 220 reach the fourth station said buttons encounter a guide 264' to direct the buttons into said claw and thereby ensure proper engagement of the buttons within the claw. Brush ejecting cams 267 secured to the cam shaft 25 at opposite ends of the turret are engaged with brush ejecting levers 268 pivotally mounted on lever supports 269 secured atop the plates 28 within the sections 27 of the housings at opposite ends of the turret, as shown in Figs. 4, 5, 6 and 7 of the drawings, the upper ends of the levers being pivotally connected to the ends of chuck actuating rods 270 in the manner shown in said figures.

As hereinbefore explained the mechanism for operating the chucks at the lefthand end of the turret, disregarding the mounting of the chucks to provide for bodily lengthwise movement thereof, is the same as that just described for the chucks at the righthand end of the turret except that the cams for operating the chucks at opposite ends of the turret may be a little differently formed to provide for slight delayed or advanced times of their relative operations.

The successive operations of each pair of chucks being the same, a description of the operations of a single pair in forming a brush in a cycle of operations of the machine is as follows, it being remembered that the turret is given step-by-step movements and certain chucking operations take place as the chucks dwell at certain stations. Referring to Figs. 22 to 29 inclusive, the chucks are shown in Figs. 22 and 23 as being at the first station and at the top of the turret as shown in Figs. 1 to 10. In Fig. 22 the chucks have just received a bristle mass with two wires on opposite sides of the bristles and the chuck jaws are in their neutral positions or open at both ends. Both cams 244 simultaneously act to operate the chuck actuating rods 247 and jaw actuating spindles 225 to push the forks 224 inwardly thereby effecting closing movement of the ends of the jaws next to the brush by the cams 227 and the wires being securely clamped by the jaws, as shown in Fig. 23. In Figs. 24 to 27 the positions of the parts are shown after the pair of chucks has been moved from the first to the fourth station which is that station in which the chuck actuating parts are shown in section in Fig. 4. In the three step-by-step movements of the pair of chucks from the first to the fourth station three partial twists completing the twisting of the bristle portion were given to the wires, thereby twisting the wires in that portion enclosing the bristles and the position of the parts on arrival at the fourth station being as shown in Fig. 24, the chuck jaws still being closed as at the beginning but the shortening of the brush structure having drawn the chuck on the right toward the opposite chuck and the jaw actuating spindle 225 and chuck spindle 218 common to this chuck having been drawn forward, and the button 249 having entered the opening in the claw 250 as the spindle came to rest at this the fourth station. The cam 254 at the lefthand end of the machine now first operates the claw 250 for the lefthand chuck to draw the jaw actuating spindle 225 backwardly thereby causing the fork with the cam 227 to move backwardly and position the chuck jaws in a neutral or open position as seen in Fig. 25 and the wires at the lefthand end of the brush being freed, the spring 263 on the chuck spindle at the right causes that chuck to be drawn backwardly and its jaws still gripping the wires the brush structure is drawn within the lefthand chuck to the position shown in Fig. 25 with the extremities of the wires flush with the inner ends of the jaws, the housing 253 held by the stops 257 as hereinbefore explained stopping this backward movement of the righthand chuck to thus position the wires. Continued movement of the chuck actuating spindle 225 at the left now closes the chuck jaws at their inner ends, thereby clamping the extremities of the wires within the lefthand chuck as shown in Fig. 26. The claw 250 for the righthand chuck, by operation of the righthand cam 254, now draws the jaw actuating spindle 225 backwardly and the fork with the cams thereon operates to place the chuck jaws in a neutral position with the jaws open at both ends, as shown in Fig. 26, and the wires being freed the spring 263 draws the chuck backwardly to the position in said figure with the extremities of the wires flush with the inner ends of the jaws.

This position of the housing 253 to limit backward movement of the parts just explained is accomplished by the withdrawal of the stops 257 from behind the housing by the action of the levers 259 effected by the cams 261 rigidly mounted on the rod 251 rigid with the claw 250. The claw 250 is now actuated by the cam 254 to draw the fork further backward and cause the jaws on the righthand chuck to grip the wires at their extremities as shown in Fig. 27, the wires beyond the ends of the brush structure being untwisted. The turret is now given four step-by-step movements until the chucks arrive at the eighth station next to the top of the back of the turret as shown in Fig. 10 and the chucks being in the position shown in Fig. 28.

The cams 267 at opposite ends of the turret now operate simultaneously through the levers 268 and spindle 270 to open the chuck jaws into their neutral positions as shown in Fig. 29 for ejection of the brushes aided by operation of the ejectors 197 as hereinbefore explained, after which ejection the turret moves the jaws to the original positions shown in Fig. 22 with the jaws still in their neutral positions for reception of a new load as hereinbefore explained.

In accordance with the provisions of the patent statutes we have described the principles of operation of our invention together with the device which we now consider to represent the best embodiment thereof; but we desire to have it understood that the device shown is only illustrative and that the invention may be carried out by other means and applied to uses other than those above set out, and within the scope of the appended claims.

We claim:

1. A brush making machine including a support, two chucks mounted in spaced apart relation one opposite the other in axial alignment on the support to grasp opposite ends of untwisted wires of brush structures, a pinion secured to each of the chucks to rotate it, a set comprising two toothed members each engaged with one of said pinions on the diametrically opposite side thereof from that engaged by the other of said members, and means for creating independent relative movement between said sets of toothed members and said pinions to thereby effect rotation of the chucks in opposite directions to twist said wires to secure brush fibers therebetween.

2. A brush making machine including a movably mounted support, two chucks mounted in spaced apart relation one opposite the other in axial alignment on the support to grasp opposite ends of untwisted wires of brush structures, a pinion secured to each of the chucks to rotate it, a set comprising two toothed members each mounted in fixed relation with and engaged by one of the pinions on the side thereof opposite to that engaged by the other of said members, and means for moving one support with the chucks thereon independently of means for moving the other support to rotate said chucks in opposite directions to twist said wires to secure brush fibers therebetween.

3. A brush making machine including a support, two chucks mounted one opposite the other on the support to grasp opposite ends of untwisted wires of brush structures, means for rotating the chucks in opposite directions to twist said wires to secure brush fibers therebetween, and means for supplying said brush material to the wires and between them to be twisted thereby.

4. A brush making machine including a support, two chucks mounted one opposite the other on the support to grasp opposite ends of untwisted wires of brush structures, a pinion rigidly connected with each of said chucks, an internally toothed ring gear meshing with one of said pinions, an externally toothed spur gear meshing with the other of said pinions, and means for imparting relative rotation between each of said gears and the pinion meshing therewith to thereby rotate the chucks in opposite directions to twist said wires to secure brush fibers therebetween.

5. A brush making machine including a rotatably mounted support, two chucks mounted one opposite the other on the support to grasp opposite ends of untwisted wires of brush structures, a pinion rigidly connected with each of said chucks, an internally toothed ring gear meshing with one of said pinions, an externally toothed spur gear meshing with the other of said pinions, and means for rotating said support to thereby effect rotation of said chucks in opposite directions to twist said wires to secure brush fibers therebetween.

6. A brush making machine including a support, a plurality of chucks mounted on the support in two rows arranged in pairs with one member of each pair positioned in a row opposite its companion member in the opposite row to grasp one end of a pair of untwisted wires of brush structures, a pinion rigidly connected with each of said chucks, toothed members each engaged with all of the pinions in one of said rows and on the opposite sides of said pinions from the sides engaged by the other of said toothed members, and means for imparting relative movement between said support and said toothed members to rotate said chucks in opposite directions to twist said wires to secure brush fibers therebetween.

7. A brush making machine including a movably mounted support, a plurality of chucks mounted on the support in two rows arranged in pairs with one member of each pair positioned in a row opposite its companion member in the opposite row to grasp one end of a pair of untwisted wires of a brush structure, a pinion rigidly connected with each of said chucks, toothed members each engaged with all of the pinions in one of said rows and on the opposite sides of said pinions from the sides engaged by the other of said toothed members, and means for imparting movement to said support to rotate said chucks in opposite directions to twist said wires to secure brush fibers therebetween.

8. A brush making machine including a support, a plurality of chucks mounted on the support in two rows arranged in pairs with one member of each pair positioned in a row opposite its companion member in the opposite row to grasp one end of a pair of untwisted wires of a brush structure, a pinion rigidly connected with each of said chucks, toothed members each engaged with all of the pinions in one of said rows and on the opposite sides of said pinions from the sides engaged by the other of said toothed members, and means for imparting relative rotation between said toothed members and said support to rotate said chucks in opposite directions to twist said wires to secure brush fibers therebetween.

9. A brush making machine including a rotatably mounted support, a plurality of pairs of chucks mounted on the support arranged in pairs in two rows with one member of each pair positioned in a row opposite its companion member in the opposite row to grasp one end of a pair of untwisted wires of brush structures, a pinion rigidly connected with each of said chucks, toothed members each engaged with all of the pinions in one of said rows and on the opposite sides of said pinions from the sides engaged by the other of said toothed members, and means for rotating said support to rotate said chucks in opposite directions to twist said wires to secure brush fibers therebetween.

10. A brush making machine including a rotatably mounted turret, a plurality of pairs of chucks mounted in spaced relation on said turret with one member of each pair positioned in a row at one end of the turret opposite its companion member in a second row at the opposite end of said turret, said chucks being each constructed and arranged to grasp one end of a pair of untwisted wires of a brush structure, a pinion rigidly connected with each of said chucks, a stationary ring gear having internal teeth meshing with the teeth of the pinions in one of said rows, a stationary gear having external teeth meshing with the teeth of the pinions in the opposite row, and means for rotating said turret to thereby rotate the chucks of each pair of chucks in opposite directions to twist the wires of said brush structure in opposite directions.

11. A brush making machine including a support, a pair of chucks with its members oppositely arranged on said support to grasp the wires of untwisted brush structures, a pinion rigidly connected with each of said chucks, an internally toothed ring gear meshing with the teeth of one of said pinions, an externally toothed gear meshing with the teeth of the other of said pinions, and means for imparting relative rotating movement between said pinions and said gears to twist the wires of said brush structures in opposite directions.

12. A brush making machine including a rotatably mounted support, a pair of chucks with its members oppositely arranged on said support to grasp the wires of untwisted brush structures, a pinion rigidly connected with each of said chucks, an internally toothed ring gear meshing with the teeth of one of said pinions, an externally toothed gear meshing with the teeth of the other of said pinions, and means for rotating said support to twist the wires of said brush structures in opposite directions.

13. A brush making machine including a movably mounted support, a pair of chucks with its members oppositely located on said support to grasp opposite ends of untwisted wires of brush structures, said chucks each having an opening on one side to receive the ends of said wires, means for imparting step-by-step movements to said support, means connected with the chucks and actuated by movement of said support to rotate the chucks in opposite directions, and means embodied in said moving means for placing said openings in definite positions to receive wires at a receiving station and also for locating said openings in definite positions for discharge of wires at a discharge station.

14. A brush making machine including a rotatably mounted support, a pair of chucks with its members oppositely located on said support to grasp opposite ends of untwisted wires of brush structures, said chucks each having an opening on one side to receive the ends of said wires, means for imparting step-by-step rotating movement to said support, means connected with the chucks and actuated by movement of the support to rotate the chucks in opposite directions, and means embodied in said support rotating means for placing said openings in definite positions to receive wires at a receiving station and also for locating said openings in definite positions for discharge of wires at a discharge station.

15. A brush making machine including a rotatably mounted turret, a plurality of pairs of chucks equally spaced apart upon said turret with one member of each pair located in a row at one end of the turret opposite its companion member in another row at the opposite end of the turret each pair of chucks to grasp opposite ends of untwisted wires of brush structures, said chucks each having an opening on one side to receive the ends of said wires, means for imparting step-by-step rotating movement to said turret, means connected with the chucks and actuated by movement of the turret to rotate the chucks of each pair in opposite directions, and means embodied in said turret rotating means for placing said openings of each pair of chucks in definite positions to receive wires at a receiving station and also for locating said openings in definite positions for discharge of wires at a discharge station.

16. A brush making machine including a rotatably mounted turret, a plurality of pairs of chucks equally spaced apart on said turret each pair of chucks to grasp the opposite ends of untwisted wires of brush structures the members of each pair being located opposite each other in two rows at opposite ends of the turret, means for imparting step-by-step movements to the turret from a receiving to a discharge station, means connected with the turret and actuated by rotation thereof for rotating the chucks in opposite directions, means at the receiving station for operating the chucks to grasp the wires, and means at the discharge station for operating the chucks to release the wires.

17. A brush making machine as described in claim 16 in which there are means intermediate the receiving and discharge stations for operating the chucks to release the wires and then to again regrasp them.

18. A brush making machine as described in claim 16 in which the means for actuating the chucks are separate for each of the rows of chucks.

19. A brush making machine as described in claim 16 in which both of the chucks of each pair are equipped to grasp the wires at the ends of the brush fibers and also at the ends of the wires spaced from said fibers.

20. A brush making machine as described in claim 16 in which one member of each pair of chucks in one row is stationary as to longitudinal movement and the other member of each pair is mounted for longitudinal movement.

21. A brush making machine as described in claim 16 in which longitudinally movable chucks in one row are biased backwardly and there is a yieldingly automatically actuating backwardly movable stop to limit such backward movement carrying the brush structure upon release of the wires by the chucks in the opposite row to finally position the wires in the last mentioned chucks.

22. A brush making machine as described in claim 16 in which longitudinally movable chucks in one row are biased backwardly and there is a backwardly movable stop to limit such backward movement carrying the brush structure upon release of the wires by the chucks in the opposite row to finally position the wires in the last mentioned chucks and there is another stop operating to limit backward movement of the first mentioned stop upon release of the wires by the longitudinally movable chucks to finally position the wires in said last mentioned chucks.

23. A brush making machine including a rotatably mounted turret, a plurality of pairs of chucks equally spaced apart on said turret, each pair to grasp the opposite ends of untwisted wires of brush structures, the members of each pair being located opposite each other in two rows at opposite ends of the turret, the members in one of said rows being longitudinally movable and the members in the opposite row being longitudinally stationary, means for imparting step-by-step movement to the turret from a receiving to a discharge station, means connected with the chucks and operated by rotation of the turret for rotating the chucks in opposite directions, means at the receiving station for operating the chucks to receive the wires, means at an advanced station for operating the chucks to first release the wires as to the stationary chucks and then to regrasp them and further means at said advanced station for then releasing the wires of the longitudinally movable members and then for regrasping said wires, and means at the discharge station for simultaneously operating the chucks to release said wires.

24. A brush making machine including a rotatably mounted turret, a plurality of pairs of chucks equally spaced apart on said turret to grasp the opposite ends of untwisted wires of brush structures, the members of each pair being located opposite each other in two rows at opposite ends of the turret, means for imparting step-by-step movement to the turret, said means including a one-revolution clutch arranged to make one revolution for each one-step movement of the turret, and means operatively connected with the chucks and arranged to be actuated by rotation of the turret for rotating the chucks in opposite directions to twist the wires held therein.

25. A brush making machine including a rotatably mounted turret, means for imparting a step-by-step movement to said turret, a plurality of pairs of chucks equally spaced apart on said turret to grasp the opposite ends of untwisted wires of brush structures, the members of each pair being located opposite each other in two rows at opposite ends of the turret, a receiving member arranged to position untwisted brush structures, each comprising brush fibers between two wires, between the members of each pair of chucks between dwells in the movement of the turret, and means for placing two wires with brush material therebetween upon said receiving member.

26. A brush making machine as described in claim 25 in which the receiving member is in the form of a carrier movably mounted to deliver the untwisted brush structures between the members of each pair of chucks.

27. A brush making machine as described in claim 25 in which the receiving member is in the form of a carrier and in which there is also embodied means for supplying two wires with brush material therebetween to the carrier in one position thereof and for location between said chucks in another position of the carrier.

28. A brush making machine as described in claim 25 in which the receiving member is in the form of a carrier having a normal position of rest together with means for positioning a wire in the path of movement of the carrier to a receiving position, means for placing a mass of fibers upon said wire, means for placing a second wire upon said mass of fibers on the carrier, and means for moving the carrier to a position between the chucks.

29. A brush making machine including a rotatably mounted turret, means for imparting rotating movement to said turret, a plurality of pairs of chucks equally spaced apart on said turret to grasp the opposite ends of untwisted wires of brush structures, the members of each pair being located opposite each other in two rows at opposite ends of the turret, a carrier arranged to position untwisted brush structures, each comprising brush fibers between two wires, between the members of each pair of chucks in the turret, means for supplying brush material to said carrier, a wire feed mechanism, means for operating said mechanism to place wires on opposite sides of said brush material on the carrier, and means for operating said carrier.

30. A brush making machine as described in claim 29 and in which the wire feed mechanism includes two members one movably mounted within the other for operation underneath the lower end of a wire supply to receive wires therefrom, means for moving said wire feed mechanism complete to present a wire in the path of said carrier for deposit of a wire thereon, and means for repeating said movement of the wire feed mechanism with relative movement between the two members thereof to release a wire to be dropped on to said carrier.

31. A brush making machine including a rotatably mounted turret, means for imparting rotating movement to said turret, a plurality of pairs of chucks equally spaced apart on said turret to grasp the opposite ends of untwisted wires of brush structures, the members of each pair being located opposite each other in two rows at opposite ends of the turret, a carrier arranged to position brush structures each comprising brush fibers between two wires between the members of each pair of chucks in the turret, a wire feed mechanism operatively positioned underneath the lower end of a wire supply to receive wires therefrom, means for moving said wire feed mechanism to present a wire in the path of said carrier for deposit of a wire thereon, means for supplying brush fibers to said carrier on top of said wires, and means for repeating the movement of said carrier on said wire feed and for releasing a wire to be dropped on top of said fibers.

32. A brush making machine including a rotatably mounted turret, means for imparting rotating movement to said turret, a plurality of pairs of chucks equally spaced apart on said turret to grasp the opposite ends of untwisted wires of brush structures, the members of each pair being located opposite each other in two rows at opposite ends of the turret, a carrier arranged to position untwisted brush structures each comprising brush fibers between two wires between the members of each pair of chucks in the turret, a wire feed mechanism operatively positioned underneath the lower end of a wire supply to receive wires therefrom, means for operating said wire feed mechanism to place a wire in the path of said carrier, means for raising the carrier to a receiving position, means for placing brush material on top of the wire on said carrier, means for lowering the carrier to a position below said wire feed, means for moving the wire feed to a position over the carrier and for releasing a wire to be dropped on to the brush fibers on the carrier, means for operating the chucks to grasp said wires, and means for lowering the carrier away from the brush structures.

33. A brush making machine including a rotatably mounted turret, means for imparting rotating movement to said turret, a plurality of pairs of chucks equally spaced apart on said turret to grasp the opposite ends of untwisted wires of brush structures, the members of each pair being located opposite each other in two rows at opposite ends of the turret, a carrier arranged to position untwisted brush structures each comprising brush fibers between two wires between the members of each pair of chucks in the turret, means for moving the carrier with a wire thereon to a receiving position, means for depositing a layer of brush fibers upon top of said wire on the carrier, means for moving the carrier to a position with the brush structures in line with the axes of the chucks, means for placing a wire upon the brush fibers on the carrier, a presser with means for operating it to engage the wires on the carrier, and means for operating the chucks to grasp the opposite ends of said wires.

34. A brush making machine including a rotatably mounted turret, means for imparting rotating movement to said turret, a plurality of pairs of chucks equally spaced apart on said turret to grasp the opposite ends of untwisted wires of brush structures, the members of each pair being located opposite each other in two rows at opposite ends of the turret, a carrier arranged to position untwisted brush structures, each comprising brush fibers between two wires between the members of each pair of chucks in the turret, a wire feed mechanism movable to place a wire thereon in the path of said carriers, means for moving the carrier from a lowered position into engagement with said wire and to a receiving position, means for placing a layer of fibers upon said carrier on top of said wire, means for moving the carrier to a position with the brush structures in axial alignment with the chucks, vacuum means for retaining the fibers in position during such movement, means for operating the wire feed to place a second wire on top of the brush fibers on the carrier, a presser with means for operating it to engage the wires on the carrier to hold them in place, means for removing the vacuum from the carrier, means for operating the chucks to grasp said wires, and means for moving the carrier to its lowered position.

35. A wire feed for a brush making machine, the latter including a movably mounted support, with a pair of chucks oppositely positioned thereon, a carrier to position brush structures composed of brush fibers between two untwisted wires between said chucks and means for supplying brush fibers to said carrier, said wire feed comprising movably mounted wire feeding members one movable within the other, means for moving the wire feed complete to place a wire in the path of said carrier, and means for moving the wire feed and one of the members thereof independently of the other to release a second wire for deposit on said carrier.

36. A wire feed for a brush making machine, the latter including a rotatably mounted turret, a plurality of pairs of chucks equally spaced apart on said turret to grasp the opposite ends of untwisted wires of brush structures, the members of each pair of chucks being located opposite each other in two rows at opposite ends of the turret, a carrier to position brush structures composed of brush fibers between two untwisted wires between said chucks and means for supplying brush fibers to said carrier, said wire feed comprising movably mounted wire feed members one movable within the other, means for moving the wire feed complete to place a wire in the path of said carrier, and means for moving the wire feed and one of the members thereof independently of the other to release a second wire for deposit on said carrier.

37. A wire feed for a brush making machine, the latter including a movably mounted support with a pair of chucks oppositely positioned thereon, a carrier to position brush structures composed of brush fibers between two untwisted wires between said chucks, and means for supplying brush structures to said carrier, said wire feed comprising movably mounted wire feed members one movable within the other, means for moving the wire feed complete to place a wire in the path of said carrier, and means for moving the inner member of the wire feed independently of the outer member thereof to release a second wire for deposit on the carrier.

38. A brush making machine including a movably mounted support, a pair of chucks mounted on said support to grasp the opposite ends of untwisted wires of brush structures, a carrier movably mounted into and opposite the space between the chucks for arrangement of untwisted brush structures thereon for delivery to the chucks, a receptacle containing brush fibers arranged in a column opposite said space for supply of said fibers to said carrier, means for producing a layer of fibers from said column for placement on said carrier, and means for operating the chucks to grasp said wires.

39. A brush making machine including a rotatably mounted turret, a plurality of pairs of chucks equally spaced apart on said turret to grasp the opposite ends of untwisted wires of brush structures, the members of each pair being located opposite each other in two rows, one row at each end of the turret, a carrier movably mounted into and opposite the space between the chucks for the arrangement of untwisted brush structures thereon for delivery to the chucks, a receptacle containing brush fibers arranged in a column opposite said space for supply of said fibers to said carrier, means for producing a layer of fibers from said column for placement on said carrier, and means for operating the chucks to grasp said wires.

40. A brush making machine including a movably mounted support, a pair of chucks mounted on said support to grasp the opposite ends of untwisted wires of brush structures, a deposit of brush fibers arranged in a column, a blade reciprocatingly movable across the end of said column to remove a layer of fibers therefrom and arranged to produce a layer in its movement in each direction, a carrier movably mounted to receive said layers to present them between the chucks, means for placing wires on opposite sides of each of said layers on the carrier, and means for operating the chucks to grasp said wires.

41. A brush making machine including a movably mounted support, a pair of chucks mounted on said support to grasp the opposite ends of untwisted wires of brush structures, a deposit of brush fibers arranged in a column, a blade reciprocatingly movable across the end of said column, said blade comprising two sections with pointed ends separated to provide a space for movement therethrough of layers of fibers separated by the blade in its movement in opposite directions, a carrier movably mounted to receive said layers to present them between the chucks, means for placing wires on opposite sides of each of said layers on the carrier, and means for operating the chucks to grasp said wires.

42. A brush making machine including a movably mounted support, a pair of chucks mounted on said support to grasp the opposite ends of untwisted wires of brush structures, a deposit of brush fibers arranged in a column, a blade reciprocatingly movable across the end of said column, said blade comprising two sections with pointed ends having sloping surfaces to provide a recess and sharpened ends separated to provide a space for movement of layers between the ends of the blade thereby to produce a layer of fibers by said blade in its movement in each direction, a carrier movably mounted to receive said layers to present them between the chucks, means for placing wires on opposite sides of each of said layers on the carrier, and means for operating the chucks to grasp the wires.

43. A brush making machine including a movably mounted support, a pair of chucks mounted on said support to grasp the opposite ends of untwisted wires of brush structures, a deposit of brush fibers arranged in a column, a blade reciprocatingly movable across the end of said column to remove a layer of fibers therefrom and arranged to produce a layer in its movement in each direction, a carrier movably mounted to receive said layers to present them between the chucks, means for placing wires on opposite sides of each of said layers on the carrier, means for operating the carrier to receive a layer of fibers in each movement of said blade in each direction, and a half-revolution clutch operatively connected with said blade for the operation thereof to produce a movement in one direction at each half revolution of the clutch.

44. A brush making machine including a rotatably mounted turret, operating mechanism including means for imparting step-by-step rotating movement to said turret, said means including a one-revolution clutch connected to produce each of said one-step movements in each revolution of the clutch, a half-revolution clutch connected into said mechanism and arranged to make a one-half revolution at each revolution of said one-revolution clutch, a plurality of pairs of chucks equally spaced apart on said turret to grasp the opposite ends of untwisted wires of brush structures, the members of each pair of chucks being located opposite each other in two rows, one row at each end of the turret, a carrier to position brush structures composed of brush fibers between two untwisted wires successively between said chucks, a deposit of brush fibers arranged in a column opposite said carrier, a blade reciprocatingly movable across the end of said column to remove layers of fibers therefrom and arranged to produce a layer in its movement in each direction, an operative connection between said blade and said half-revolution clutch for operation of the blade in one direction at each half revolution of said half-revolution clutch, and means for operating said chucks to grasp said wires.

HENRY CAVE.
ALFRED H. FULLER.
ALFRED L. LE FEBVRE.